(12) United States Patent
Chaklader

(10) Patent No.: US 6,582,676 B2
(45) Date of Patent: Jun. 24, 2003

(54) HYDROGEN GENERATION FROM WATER SPLIT REACTION

(75) Inventor: Asoke Chandra Das Chaklader, Vancouver (CA)

(73) Assignee: The University of British Columbia, Vancouver (CA)

(*) Notice: Subject to any disclaimer, the term of this patent is extended or adjusted under 35 U.S.C. 154(b) by 124 days.

(21) Appl. No.: 09/778,091

(22) Filed: Feb. 7, 2001

(65) Prior Publication Data

US 2002/0048548 A1 Apr. 25, 2002

Related U.S. Application Data

(63) Continuation-in-part of application No. 09/637,930, filed on Aug. 14, 2000, now Pat. No. 6,440,385.

(51) Int. Cl.$^7$ .............................. C01B 3/02; C01B 3/10
(52) U.S. Cl. ................................. 423/648.1; 423/657
(58) Field of Search ............................. 423/648.1, 657

(56) References Cited

U.S. PATENT DOCUMENTS

| | | | | |
|---|---|---|---|---|
| 3,348,919 A | * | 10/1967 | Shumway | 423/657 |
| 3,716,416 A | | 2/1973 | Adlhart | 136/86 B |
| 3,966,895 A | | 6/1976 | Wilhelm | 260/668 D |
| 3,985,865 A | | 10/1976 | Hohne | 423/657 |
| 4,064,226 A | | 12/1977 | Becker | 423/657 |
| 4,072,514 A | | 2/1978 | Suzuki | 75/168 R |
| 4,356,163 A | | 10/1982 | Davidson | 423/657 |
| 4,988,486 A | | 1/1991 | Harris et al. | 422/191 |
| 5,143,047 A | | 9/1992 | Lee | 126/263 |
| 5,494,538 A | | 2/1996 | Kirillov et al. | 148/420 |
| 5,510,201 A | | 4/1996 | Werth | 429/17 |
| 5,514,353 A | | 5/1996 | Adlhart | 422/239 |
| 5,593,640 A | | 1/1997 | Long et al. | 422/111 |
| 5,728,464 A | | 3/1998 | Checketts | 428/403 |
| 5,817,157 A | | 10/1998 | Checketts | 48/61 |
| 5,840,270 A | | 11/1998 | Werth | 423/658 |
| 6,093,501 A | | 7/2000 | Werth | 429/17 |

FOREIGN PATENT DOCUMENTS

| | | |
|---|---|---|
| FR | 2658181 | 8/1991 |
| GB | 1378820 | 12/1974 |
| GB | 1420048 | 1/1976 |
| GB | 1496941 | 1/1978 |
| JP | 0216242 | 2/1992 |

OTHER PUBLICATIONS 0 417 279 A1 EBC App = WO 90/09956 Mar. 20, 1991.
Search Report from Corresponding PCT Application No PCT/CA01/01115.

* cited by examiner

Primary Examiner—Stanley S. Silverman
Assistant Examiner—Maribel Medina
(74) Attorney, Agent, or Firm—C. A. Rowley

(57) ABSTRACT

A method of producing Hydrogen by reacting a metal selected from the group consisting of Aluminum (Al), Magnesium (Mg), Silicon (Si) and Zinc (Zn) with water in the presence of an effective amount of a catalyst at a pH of between 4 and 10 to produce Hydrogen. The catalyst or other additive is selected to prevent or slow down deposition of the reaction products on the (impair reactions with the) metal that tend to passivate the metal and thereby facilitates the production of said Hydrogen.

24 Claims, 11 Drawing Sheets

HYDROGEN GENERATION FROM WATER SPLIT REACTION

This application is a Continuation-in-part of U.S. patent application Ser. No. 09/637,930 filed Aug. 14, 2000 now U.S. Pat. No. 6,440,385.

FIELD OF THE INVENTION

This invention relates to a method of generating Hydrogen from water. More particularly, this invention pertains to a method of producing Hydrogen from water using metal-catalyst systems, such as ceramic, carbon or polymer composites, at ambient or elevated temperature and at neutral, or close to neutral pH.

BACKGROUND OF THE INVENTION

The generation of Hydrogen utilizing inexpensive simple processes is becoming increasingly important. The increasing demand for Hydrogen arises from the imminent paradigm shift to a Hydrogen-based energy economy, such as in Hydrogen fuel cells. This shift approaches as the worldwide need for more electricity increases, greenhouse gas emission controls tighten, and fossil fuel reserves wane. The attendant market for fuel generators addresses the near term lack of Hydrogen supply infrastructure that is necessary for the proliferation of the Hydrogen fuel cell. Hydrogen-based economy is the only long-term, environmentally benign alternative for sustainable growth. Over the last few years it is becoming more apparent that the emphasis on cleaner fuel will lead to use of Hydrogen in a significant way. Providing that renewable energy sources, such as hydroelectricity or solar energy, are used to produce Hydrogen through decomposition of water, there are no environmental threats produced by the Hydrogen economy.

The common method to recover Hydrogen from water is to pass electric current through water and thus to reverse the oxygen-Hydrogen reaction, i.e. in water electrolysis. Another method involves extraction of Hydrogen from fossil fuels, for example from natural gas or methanol. This method is complex and always results in residues, such as carbon dioxide, at best. And there is only so much fossil fuel available. In these reforming methods the resulting Hydrogen must be somehow stored and delivered to the user, unless the Hydrogen generation is performed "on-board", close to the consumption system. The safe, reliable, low-cost Hydrogen storage and delivery is currently one of the bottlenecks of the Hydrogen-based economy. The current invention addresses this problem through safe, "on-board/on-demand" production of Hydrogen close to the user systems, using simple, safe and pollution-free metal-ceramic composites reacting with water.

This invention relates to a novel method of generating Hydrogen from water. Water consists of two elements: oxygen and Hydrogen. A relatively large amount of energy is released when these two elements react to form water. This energy may be captured and efficiently converted to electricity in fuel cells. More importantly, nothing else is released when oxygen and Hydrogen react to form water. Consequently, the Hydrogen-oxygen reaction is potentially a pollution-free source of energy. Although about 20% of air is oxygen, there is no easily accessible, safe source of Hydrogen available. The current invention addresses this problem.

There are only a few resources that can produce abundant Hydrogen and these include hydrocarbons and water. Of these, the only pollution free source of Hydrogen is water.

One of the problems that must be addressed before the new Hydrogen economy replaces the current "oil/gas/coal/nuclear" economy, is finding a safe, environmentally benign and cost-effective method of generation, storage and distribution of Hydrogen. This issue is the primary focus of the present invention.

It is known that some metals produce spontaneously Hydrogen in contact with water. These are, for example, alkaline metals such as potassium (K) or sodium (Na). These metals could be used as water-split agents through the simple reaction, which proceeds spontaneously once metal is dropped into water:

$$2K + 2H_2O \rightarrow 2KOH + H_2 \tag{1}$$

Similar reactions can be written for other alkalis, e.g. Na. Unfortunately the residual hydroxide product (i.e. KOH in the above reaction) causes very high alkalinity of the resulting products, making them corrosive, dangerous to handle and potentially polluting to the environment. As the reaction (1) proceeds spontaneously and violently, the reacting metals must be always protected from undesirable contact with water (i.e. effectively also from air which under normal conditions will contain water vapor). This increases costs of the technology and adds safety and pollution problems. The reaction products are not easy to handle and recycle. Reaction (1) has an advantage in that the reaction products (i.e. KOH) continuously dissolve in the reacting water, and thus allow the reaction to continue until all metal reacts. Similar effect was difficult to achieve with other attractive metals such as Aluminum, as in this case the reaction products, i.e. $Al(OH)_3$, tend to deposit on the surface of the reacting metal and thus restrict access of reactants (e.g. water or oxygen) to metal surface, eventually stopping the reaction. This "passivation" phenomenon is a fortunate property of reactive metals such as Al, as it preserves them in substantially corrosion-free state in wide variety of applications, as long as environment is not too acidic or alkaline. At the same time, passivation does not allow to use Al for generating Hydrogen from water at close to neutral pH. The presently disclosed invention teaches a simple method preventing formation of the passivation layer of products on the Al surface, and thus allows to use Al for generation of Hydrogen from water at close to neutral pH.

The research intensity, and the proportional literature volume pertaining novel means of Hydrogen generation and use, is extremely large and increasing in recent years. Below we present the selected patent publications that may have some relationship to the present invention. A number of variants of water split reaction to produce Hydrogen have been disclosed in the past, primarily involving alkali metals or alkaline environments.

Two patents (U.S. Pat. Nos. 5,817,157 and 5,728,464) that describe a system for the controlled generation of Hydrogen from spherical polyethylene-coated Na or NaH pellets have been issued to Jed Checketts [1,2]. The system comprises a container to hold the pellets and water, a hydraulic system for splitting open the pellets, and a Hydrogen sensor and computer which provides a feedback loop for activating the pellet splitter. This technology supercedes other patents that have been issued for controlled Hydrogen generators that employ alkali metals (U.S. Pat. Nos. 4,356,163 [3]; 5,514,353 [4]; 3,716,416 [5]) or metal hydrides (U.S. Pat. No. 5,593,640 [6]) or iron (U.S. Pat. No. 5,510,201 [7]) and water.

Another patent describes a generator that employs hydrochloric acid and pure metal (U.S. Pat. No. 4,988,486 [8]).

Additional patents have been issued for the generation of Hydrogen gas in an uncontrolled manner (U.S. Pat. Nos.

5,143,047 [9]; 5,494,538 [10]; 4,072,514 [11]; 4,064,226 [12]; 3,985,865 [13]; and 3,966,895 [14]) in systems comprising mixtures of alkali or alkali earth metals and/or Aluminum and water or aqueous salt solutions.

European patent application 0 417 279 A1 published Mar. 20, 1991 (see also JP. Pat. No. 1,061,301[15]), teaches the production of Hydrogen from a water split reaction using Aluminum and a ceramic namely calcined dolomite, i.e. calcium/magnesium oxide. Once contacted with water, these oxides cause very substantial increase of pH (i.e. create alkaline environment), which stimulates corrosion of Al with accompanying release of Hydrogen. The system has all the disadvantages of water split reaction using alkaline metals, i.e. high alkalinity and difficult recyclability of the products. In one case, the Mg and Al are mechanically ground together to form a composite material which is then exposed to water (U.S. Pat. No. 4,072,514 [16]).

Continuous removal of the passivation layer on Aluminum by mechanical means, in order to sustain Aluminum assisted water split reaction, has been disclosed in (FR Pat. No. 2,465,683) [17]. This patent describes a method of automatic gas production by reaction of alkaline solution with metal-incorporating feeding without interruption of reaction and continuous metal cleaning applicable in producing Hydrogen for energy source. For Hydrogen production Aluminum on sodium hydroxide solution in water was used.

The concept of water split-reaction for on-board generation of Hydrogen for automotive propulsion has been disclosed in U.S. Pat. No. 5,840,270 [18] and related U.S. Pat. No. 6,093,501 [19]. These patents teach a process wherein water is passed over hot (~250° C.) iron pellets, which consume oxygen from water, producing iron oxide and Hydrogen.

None of the prior art discloses the use of metal-catalyst systems, such as ceramic, carbon or polymer composites, particularly Al-catalyst composites to facilitate the water split reaction for the production of Hydrogen.

SUMMARY OF INVENTION

The main object of the present invention is to produce Hydrogen by water split reaction at a neutral pH of between 4 and 9.

A composite material comprising a mixture, mechanical or otherwise, of metal and non-metal, which when submerged in water, produces Hydrogen gas at neutral or near to neutral pH. One example includes Aluminum oxide(s) and/or Aluminum hydroxide(s) and Aluminum (Al) metal submerged in water, at or near to neutral pH, e.g. tap water. Another example includes particles of carbon and Aluminum metal submerged in water. Yet another example includes other metals, such as Magnesium (Mg), Silicon (Si) and Zinc (Zn), mixed with oxide ceramics (other examples are described in detail below). The phenomenon has been demonstrated reproducibly The evolution of Hydrogen gas ($H_2$) is dependent on several factors, namely temperature, pH, proportion and particle size of ingredients and mixing conditions. Whereas Aluminum is the component which enters into chemical reaction with water, the second non-metallic component of the system (referred to as "catalyst" or "additive") assists in preventing passivation of the Aluminum The water split reaction for the Aluminum/water system is as follows:

$$2Al + 6H_2O \rightarrow 2Al(OH)_3 + 3H_2 \{9 > pH > 4\} \quad (2)$$

Broadly the present invention relates to a method of producing Hydrogen by reacting a metal selected from the group consisting of Aluminum (Al), Magnesium (Mg), Silicon (Si) and Zinc (Zn) with water in the presence of an effective amount of a catalyst at a pH of between 4 and 10 to produce reaction products which include Hydrogen, said catalyst impairing reaction of said reaction products with said metal to passivate said metal thereby facilitating said reacting of the metal with said water and improving production of said Hydrogen.

Preferably, said metal and catalyst are blended into intimate physical contact.

Preferably, the metal and catalyst are each in the form of particles having a size between 0.01 $\mu$m and 1000 $\mu$m.

Preferably, the metal and catalyst are mixed together in a mixer that pulverizes said metal and said catalyst and exposes fresh surfaces of said metal.

Preferably, the metal and said catalyst are pressed together to from pellets and the pellets are then mixed with said water.

Preferably the metal is Aluminum (Al) and said catalyst is an additive selected from the group consisting of Alumina, other ceramic compounds containing Aluminum ions, (such as aluminum hydroxides, China clay and Ball clay), carbon (C), calcium carbonate ($CaCO_3$), and calcium hydroxide ($Ca(OH)_2$), more preferably the catalyst is Alumina or a ceramic containing aluminum ions compound.

Preferably, the Alumina or other ceramic compounds containing aluminum ions is selected from the group comprising Aluminum oxides, Aluminum hydroxides and combinations thereof.

In an alterative embodiment the catalyst is carbon.

In yet another embodiment the metal is Aluminum (Al) and the catalyst comprises an additive from the group consisting of water-soluble organic compounds, preferably polyethylene glycol (PEG).

Preferably the catalyst includes at least one additive selected from a group consisting of said Alumina, a ceramic compound containing aluminum ions and at least one additive selected from the group consisting organic compounds, preferably PEG.

In other alternatives the metal is Magnesium (Mg) and the catalyst is magnesium oxide (MgO) or Silicon (Si) and Silicon oxide ($SiO_2$) is the catalyst or the metal is Zinc (Zn) and Zinc oxide (ZnO) is the catalyst.

The system disclosed in the present invention may accelerate introduction of Hydrogen-derived power to consumer electronics (e.g. laptop computers) or transportation. For example, according to reaction (2) the Aluminum assisted water split leads to generation of about 1.2 cubic meters of Hydrogen (at standard conditions) out of 1 kg of Aluminum reacting with water. This is about 30% more than the amount of Hydrogen produced through rather complex process of reforming 1 kg of methanol, which is one of the methods proposed for supplying Hydrogen to fuel cells. More importantly, there is no carbon dioxide/monoxide produced in Aluminum assisted water split reaction. This is especially important for application in fuel cells, where small amount of CO contaminant in Hydrogen may poison the additive and make the cell dysfunctional. The "storage ratio", i.e. the mass ratio of the Hydrogen generated to the metal reactant, is therefore about 11%, substantially more than any other currently known means of on-board Hydrogen storage, e.g. through metal hydrides (the mass of water is neglected in the storage ratio as it may be partially re-circulated within the system, or replenished through abundant distribution system in place). As Aluminum, Aluminum oxide and Aluminum hydroxide are the safest materials known to humanity (e.g. are commonly used in food, drug, cosmetics etc. products), the novel process promises to be safe and manageable by simple means. The amounts of Hydrogen produced and consumed can be balanced, avoiding necessity of on-board storage of excessive amount of Hydrogen, which can become dangerous in some critical situations, e.g. container leakage.

BRIEF DESCRIPTION OF DRAWINGS

Further features objects and advantages will be evident from the following detailed description of the present invention taken in conjunction with the accompanying drawings which illustrate specific embodiments of the invention are not intended to limit the scope of the invention in any way.

DETAILED DESCRIPTION OF INVENTION

Figure 1:
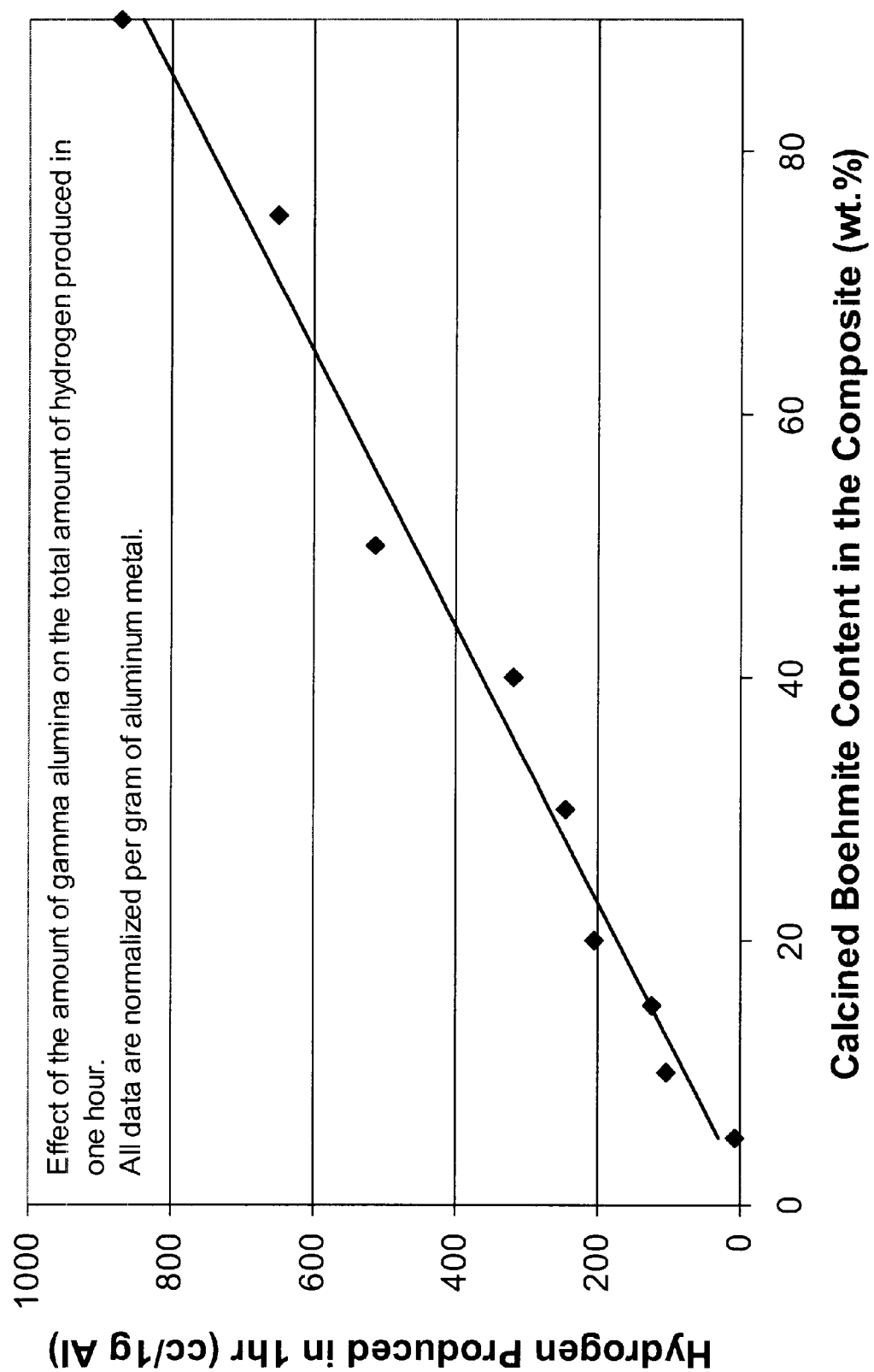
FIGS. 1, 2 and 3 present the amount of Hydrogen, in cubic centimeters (cc), produced in 1 hr in the water split reaction out of Aluminum+Alumina and Aluminum hydroxide composite systems, as a function of additive amount, reaction temperature, and pH, respectively.

One of the key features of the present invention is that the reactant system is able to sustain the Aluminum-assisted water split reaction, equation (2), in neutral, or close to neutral conditions, i.e. in the range of a pH 4 to 10 preferably pH 5 to 9.

If tap water is used (as in plurality of experiments described below) the only products of reaction (2) (i.e. after completion of the reaction) are Aluminum oxide(s), Aluminum hydroxide(s) and Hydrogen. Aluminum oxide and hydroxide are readily recyclable back to Aluminum metal through the well-known electrolysis process. The Hydrogen, thus generated, can be subsequently oxidized to water in the fuel cell. The resulting water can be feed back to sustain the water split reaction (2). The life-cycle loop for Hydrogen generation through Aluminum assisted water split is thus closed with no impact on the environment, especially if electrolysis of alumina (to produce Al) is performed using hydroelectric or other renewable form of energy.

The principal discovery disclosed in the present invention is that the pH remains substantially neutral i.e. pH 4 to 10 and that the reaction (2) is sustained, i.e. passivation layer of reaction products does not appear to hinder the reaction, if the reacting Aluminum metal is in contact with externally supplied nonmetal (ceramic) such as Aluminum oxide(s) or hydroxide(s). Thus, a composite material comprising mechanical mixture of Aluminum metal (Al) and Aluminum oxide(s) or hydroxide(s), when submerged in water, continuously produces Hydrogen gas. The reaction proceeds for the mass ratio of Al to the oxide(s) or hydroxide(s) varying over the whole range, from a few percent to up to 99% of the catalyst (or additive(s)). Similarly, the reaction proceeds in a wide range of acidity/alkalinity (pH) of water, e.g. 11>pH>2, and water temperature, e.g. from about 10° C. to 90° C. Although the reaction proceeds faster at elevated temperatures, water acidity/alkalinity in the range 9>pH>4 has relatively weak effect on the reaction rate. The phenomenon of production of Hydrogen from Aluminum and water using a water split reaction in the presence of a catalysts has been demonstrated reproducibly, as illustrated in the following figures and examples.

The principal observations are summarized as follows:

1. $H_2$ is generated in Al/additive mixtures exposed to tap water
2. existence of a triple point where water, Al and additive are all in contact, appears a necessary condition for the water split reaction to start and continue
3. The most effective additives appear to be oxides, in particular Aluminum oxides, and carbon
4. The additives, e.g. oxides or carbon, must be pulverized with Al through intensive mixing; in this process the additives are dispersed through heavily deformed Al matrix
5. The oxides effective in "catalyzing" the Al-assisted water split reaction, in order of effectiveness, include alumina (various polymorphs), Aluminum hydroxides but also alumino-silicates (ball clay, china clay), magnesia, and others.
6. Carbonates (calcium) and hydroxides (calcium), although they do produce some $H_2$ in contact with Al+water, the gas amounts are relatively small (less than a third) as compared to the alumina powders
7. The reaction is temperature-sensitive (in T=20 . . . 70° C. range), but not particularly pH sensitive (in pH range=4–9)
8. The reaction is particularly sensitive to $Al_2O_3$ content, the $H_2$ yield per unit Al increasing to almost 100% (all Al reacted) for $Al_2O_3$ content increasing up to 95 wt %.
9. Pulverizing Al powder with water-soluble polyethylene glycol (PEG) also seems to produce significant water-split reaction ($H_2$ produced is about half of that obtained using alumina additive), with yield independent on the content of PEG. However, adding to water PEG slows the reaction if oxide catalysts are used.
10. Non-Aluminum systems, i.e. metal mixed with its oxide, although do produce measurable amount of Hydrogen, are less effective in assisting in water split. Out of many tested, only Si—$SiO_2$ and Zn—ZnO in water seem to induce some $H_2$ generation Pulverizing Al+additive in closed environment causes "Mechanical Alloying", i.e. blending/encapsulation of the components, with multiple intimate interfaces between Al and the additive. As limited amount of oxygen is available in the air-tight mill volume, the surface of Al remains substantially free of oxides during milling. This likely returns to the passivated Al state (i.e. film of oxide/hydroxide on the surface) once exposed to air after milling. This can be prevented through coverage of the surface of Al particles with secondary additive phases, e.g. particles of ceramic, such as alumina or carbon, or polymer, such as polyethylene glycol (water-soluble polymer seems particularly attractive as it will expose fresh Al surface upon dissolution in water).

PEG (polyethylene glycol) pulverized with Al, through coating freshly-created surface of Al, prevents its re-oxidation during transfer from the mill to water. This effect is achieved even for relatively small, e.g. few wt % of PEG; additional amount of PEG just builds thicker layer on Al; thus the effect is independent on PEG content. Once in water, PEG dissolves and exposes relatively large area of non-passivated Al to reaction. Effectively PEG acts in a similar "enabling" way to expose fresh Al. It is then perceived as very effective method for ionizing Al especially if accompanied with oxide additive (i.e. alumina) which would preferentially accept precipitating $Al(OH)_3$. This effect is reinforced if both PEG and alumina are dispersed throughout a volume of Al particles.

Extensive experiments were performed to test the feasibility of Hydrogen generation from water, and to identify the factors affecting this process. Two critical parameters monitored were (i) total volume of $H_2$ generated per unit weight of the Aluminum (i.e. conversion efficiency) and (ii) rate of $H_2$ release. The factors affecting these two parameters have been identified as above described to be as follows:

(a) Type and concentration of the component materials, in particular Aluminum and ceramic additives
(b) Mixing, grinding and pelletization methods to bring the component materials (i.e. Aluminum and ceramic additives) to physical contact
(c) Reaction temperature
(d) Water acidity/alkalinity (pH)

Al metal with alpha-alumina, gamma-alumina, carbon (lampblack), mixtures of α-alumina and carbon, and polyethylene glycol (a water soluble organic compound) were used to determine the water split reaction rate and conversion efficiency. Attempts were also made to test other ceramic materials, such as clays, $CaCO_3$, $SiO_2$ etc., with Al to get water split reaction. Further tests were made using other metals and their oxide systems, such as Fe—$Fe_3O_4$, Cu—$Cu_2O$, Ni—NiO, Mg—MgO, Si—$SiO_2$, Ti—$TiO_2$, and Zn—ZnO, to initiate the water split reaction.

The results of these tests can be summarized as follows. The systems containing alpha-alumina and carbon with Al are as effective as gamma-alumina+Al system in generating Hydrogen gas. A combination of alpha alumina+carbon with Al is better than any system tested so far. There is an almost linear relationship with the amount of Hydrogen generated and the catalyst concentration, leading to almost full conversion with 95% catalyst (with respect to the possible theoretical amount, which is about 1.2 liters per gram of Al).

All the other (i.e. in addition to Aluminum oxide and hydroxide) ceramic materials with Al generated some Hydrogen from water. Of these the best results are with ball clay, which produced ~2/3 of the amount produced with alumina+Al system. However, this system is not attractive in terms of recyclability. In terms of other metal-oxide systems, a small amount (10%–15% of theoretical amount) of Hydrogen generation was encountered with Si—$SiO_2$ and Zn—ZnO systems.

Hydrogen generation from water using Al metal and alpha-alumina ($\alpha$-$Al_2O_3$), carbon (C) (lampblack) and other ceramic materials, was investigated to determine if other inexpensive catalysts similar alpha-alumina could be used. The purpose of using carbon was to test if the mixtures (Al+C) could be used for generating Hydrogen. Additionally, the carbon addition should improve the electrical conductivity of the composites. The effect of the electric field on the composite pellets in generating Hydrogen may be effective.

Other composites tested included Magnesium (Mg) and Magnesium Oxide (MgO), Al and Mg and $Al_2O_3$, Al and organic salt (water soluble) and other metal and oxide systems.

It has been found that both alpha-alumina and carbon (with Al) are very effective in generating Hydrogen, and as good as gamma-alumina ($\gamma$-$Al_2O_3$) derived from calcined Boehmite. It appears that Al+C+$\alpha$-$Al_2O_3$ systems are very good in generating Hydrogen from water. There are other systems with Al, which can produce Hydrogen from water, but these systems are not attractive as the final products are not easily recyclable. Mg—MgO systems are not as effective as Al+$\alpha$-$Al_2O_3$ (or Al+C) systems in generating Hydrogen from water.

The following is description of the experimental programs that tested the above variables in relationship to the use of metal-ceramic composites for water split reaction to produce Hydrogen.

Figure 2:
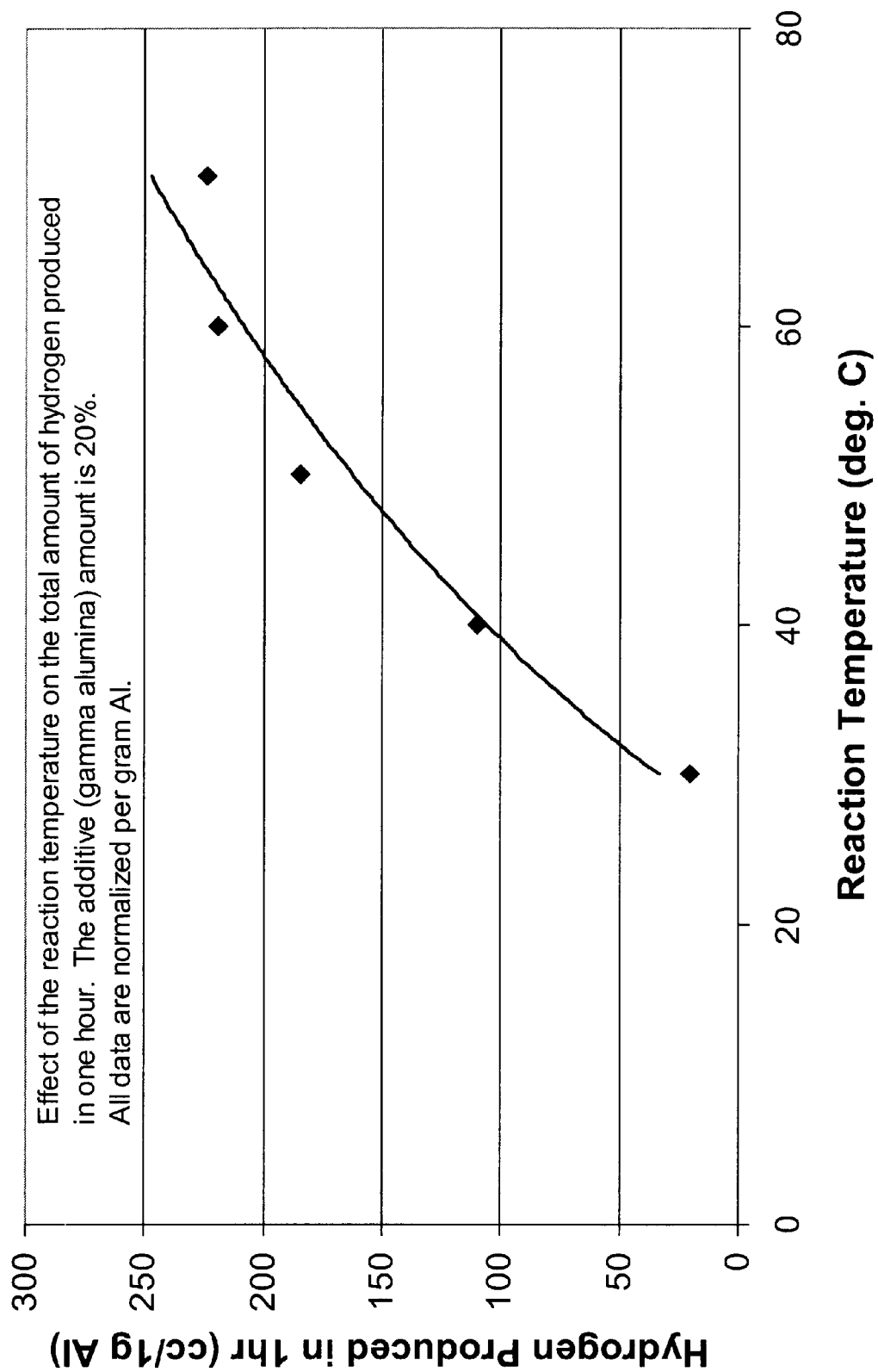
Figure 3:
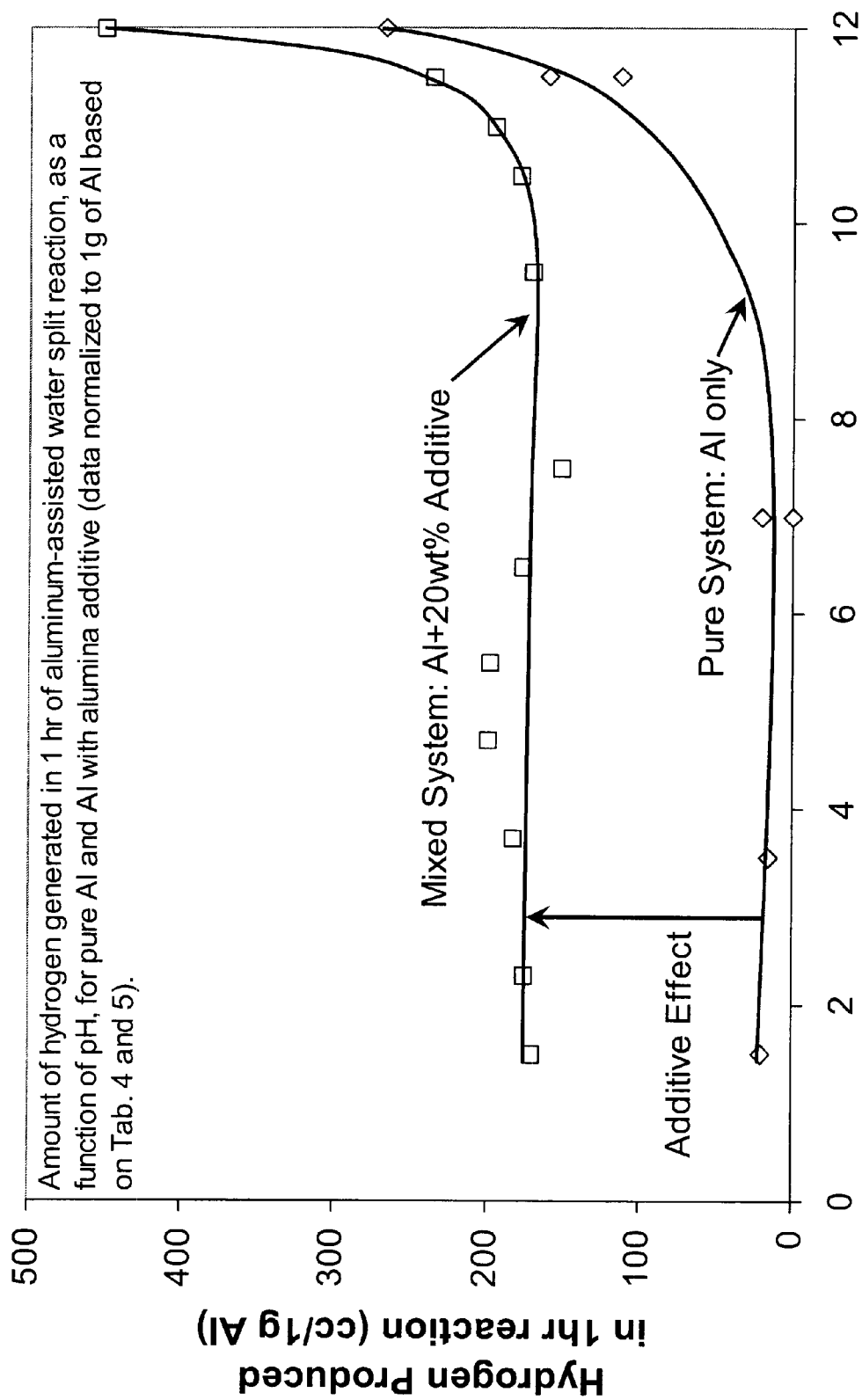

All samples used to produce the data in FIGS. 1–3 were produced in the same way, i.e. boehmite (calcined at 700° C.) was combined with appropriate amount of Al powder (99% Al, 80 μm average particle size), vibro-milled for 10 min, and pelletized at 5000 psi pressure. High-intensity vibromill, referred to as Spex mill, was used. For FIG. 1 the constants include T=50° C. and pH=6.5. For FIG. 2 the constants include amount of additive=20 wt %, and pH=6.5. For FIG. 3 the constants include T=50° C. and amount of additive in mixed system 20 wt %.

(a) Type and Concentration of the Component Materials

In one set of test Aluminum powders having five different average particle sizes of 10, 44, 60, 80 and >200 microns (μm) were used. These powders were of nominal purity i.e., ~99% pure Al, except the 60 μm powder, which was a reagent grade (99.9% Al). Although the nominal particle size was quoted by the supplier, it is noted that there is a large variation in each size grade. The largest grade powder had very coarse particles, ~80% larger than 200 μm. The additives were Aluminum oxides produced by cacining (i.e. heating in air) Aluminum hydroxides. Both monohydrate (AlOOH, known as boehmite) and trihydrate of Aluminum [$Al(OH)_3$] were used for these tests. Several grades of commercially available Aluminum oxide were also utilized. There are different crystallographic forms of Aluminum oxides, such as α, γ, etc. Both α and γ Aluminum oxides were used in these tests, but there is no doubt that other forms Aluminum oxides when ground and mixed with Aluminum metal powder will produce Hydrogen gas when added to water Effect of the Type of Ceramic Additive The effects of different type of additives used with Al are summarized in Table 1, in terms of the amount of $H_2$ released from the reactor after 1 hr of reaction, the maximum rate of Hydrogen release, and the time to the moment of maximum rate of Hydrogen release (measured from introduction of the metal-ceramic composite pellet into the water). All samples were Spex Milled for 10 min, with 30 wt % additive ceramic powder (the balance 70 wt % was the 80

μm average particle size Al powder). The mixed powders were pelletized under 8000 psi. The pellets weigh about 1 g and the testing water temperature was 50° C. Tests in water are carried out at the pH range 5.8 to 7.5 (typical fluctuations of tap water).

TABLE 1

Effect of type of additive on Hydrogen generation through Aluminum assisted water split reaction.

| Additive in Al | $H_2$ release after 1 hr (cc/g Al) | Max. Rate of $H_2$ release (cc/min) | Time to max Rate of $H_2$ Rel. (min) |
|---|---|---|---|
| Gamma Alumina | 342 | 17 | 10 |
| Alpha Alumina | 320 | 25 | 8 |
| Aluminum Trihydrate | 146 | 5 | 16 |
| Boehmite | 194 | 7 | 16 |

Figure 4:
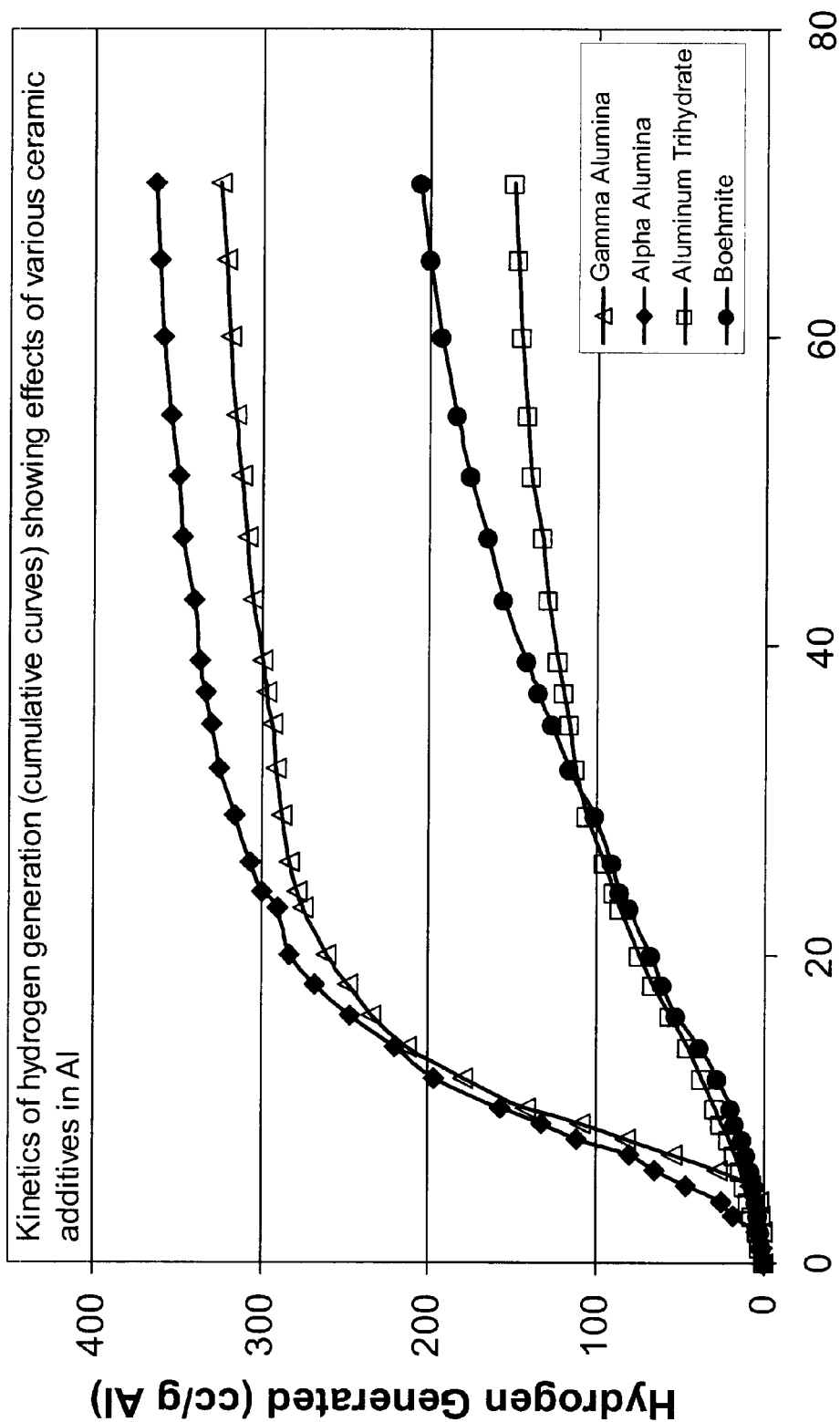
FIG. 4 illustrates several typical curves of Hydrogen accumulation over the 1 hr reaction time, for the experiments included in Table 1.

"Gamma Alumina" is produced from Boehmite by calcining at 700° C. "Boehmite" stands for Aluminum monohydrate, which was supplied by Condea Chemicals. "Boehmite" in the table is Aluminum monohydrate, and used as-received state. Alpha Alumina is obtained from Alcan, which is supplied as a free flowing powder. Aluminum Trihydrate is a synthetic Aluminum hydroxide supplied by Alcoa. Effectively, all the tested additives are alumina or hydrated alumina (Aluminum hydroxide). The kinetics of $H_2$ generation data for various additives are also illustrated in FIG. 4.

It can be easily shown from equation (2) that one gram of Aluminum metal on 15 complete conversion to Aluminum hydroxide should produce 1.24 liters (1,240 cc) of Hydrogen gas. On that basis, both Gamma and Alpha alumina produced about 25–30% of the theoretical amount of the Hydrogen. This means about 25–30% of the available Al is consumed for two alumina additives. For the other two additives in the figure, the fraction Al consumed is in the order of 10 to 15%.

All the tested aluminas, which have a tendency to hydrate in water, activate the water split reaction to generate Hydrogen in the Aluminum-assisted water split reaction. Those aluminas, which were already partially or filly hydrated, e.g. because of low calcinations temperature (or no calcinations) were less effective in assisting the water split reaction, however, these still produced Hydrogen from water. The most effective additive appears to be the boehmite calcined at 700° C. and alpha alumina.

Aluminum Metal Particle Size Effect

It has been observed that after Spex milling all Aluminum particles larger than about 30 μm got flattened and well mixed through repeated plastic deformation with the ceramic additive. Eventually, the composite particles agglomerated to similar sizes, in the range of 70 to 100 μm. There was no substantial reduction of the original size of the particles. For the largest (>200 μm) particles there is flattening observed but not much mixing with the ceramic powder. That is the reason why the amount of Hydrogen generated is similar for all particle sizes up to 80 μm. And there is less production of Hydrogen with largest Aluminum >200 μm particles. It is believed that Particle sizes in the range of about 0.01 to 1000 μm should be equally effective.

Effect of the Concentration of Ceramic Additive

Figure 5:
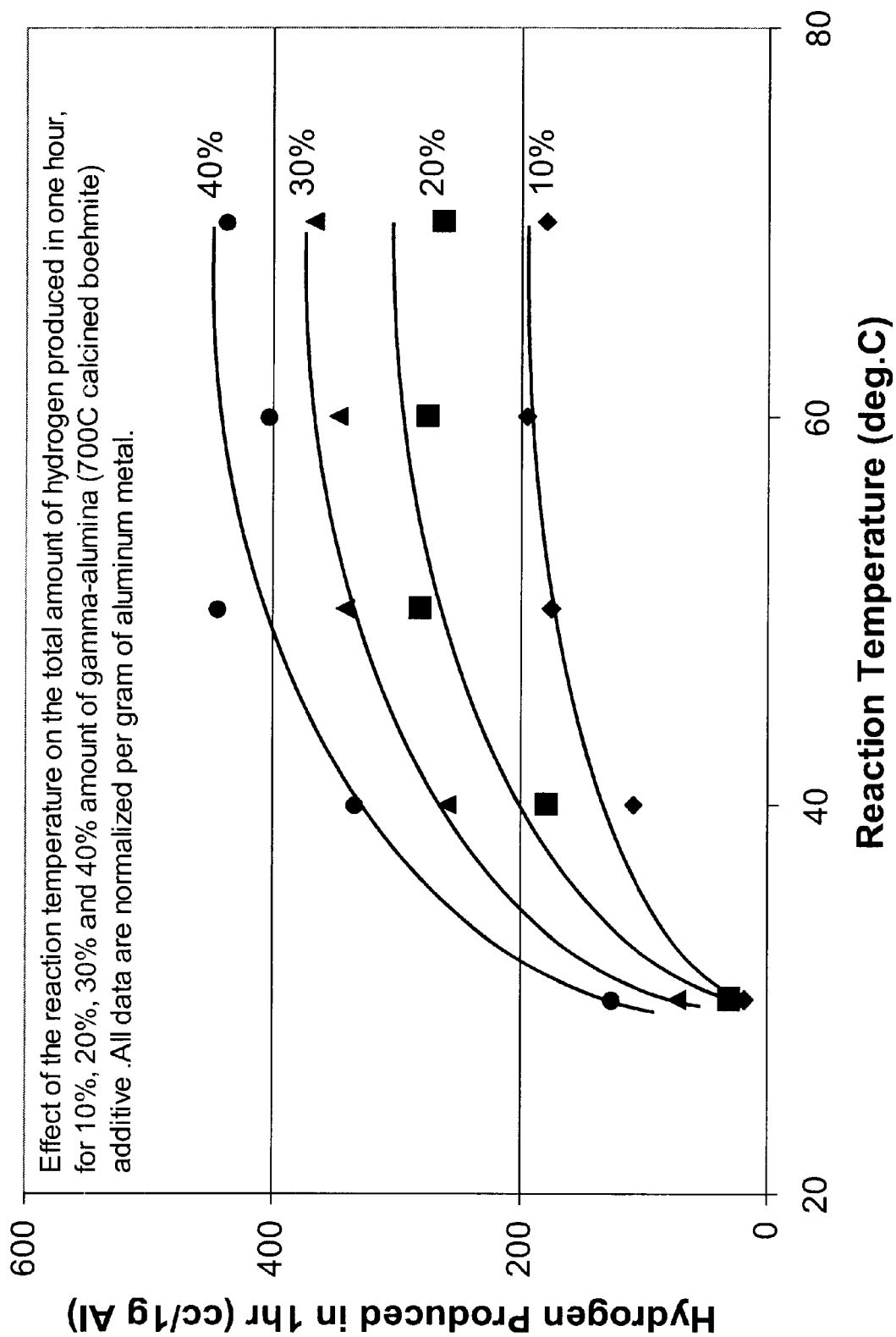
FIG. 5 is a plot showing the effect of reaction temperature on total Hydrogen produced in 1 hour for 10%, 20% 30% and 40% gamma-alumina normalized per gram of Al metal.

For these tests Aluminum metal having the average particle size 80 μm was used along with boehmite calcined at 700° C. as additive. All mixtures were Spex-milled for 10 min and pelletized under 5000 psi to about 1 g pellet. The water reaction tests were carried out at 50° C. at a pH between 5.8 and 7.5. The results are shown in Table 2 and also plotted in FIG. 5. All data are normalized as the volume of generated Hydrogen per one gram of Aluminum metal. There is a linear correlation of Hydrogen generation with the increase in additive. As the additive concentration is increased in the mixture more Hydrogen gas is generated, per unit quantity of metal (Al).

TABLE 2

Effect of the amount of additive on Hydrogen generation through Aluminum assisted water split reaction.

| Amount of Additive (wt. %) | $H_2$ release after 1 hr (cc/1 g Al) |
|---|---|
| 5 | 7 |
| 10 | 105 |
| 15 | 125 |
| 20 | 206 |
| 30 | 245 |
| 40 | 320 |
| 50 | 515 |
| 75 | 650 |
| 90 | 870 |

(b) Mixing, Grinding and Pelletization Methods

The goal of mixing/milling of the component powders was to produce a homogenous composite with multiple interfaces including the metal and ceramic in contact. In this experimental program the following methods of mixing the metallic component (powder) with ceramic component (powder) have been tried: hand grinding i.e., mixing in a mortar-pestle, ball milling and high impact mixing and grinding (Spex milling). Another possible method of high energy mixing and grinding is attrition milling. The mixing/milling may be accomplished in a batch process, i.e. milled powders pelletized and transferred to water-split reactor, or in a continuous process, wherein water and the reactant powders are fed to the mill and the reaction products (Hydrogen and hydroxides) continuously released from the mill. The batch process is experimentally simpler and therefore most disclosed experiments were completed in such process. The continuous process is more technologically challenging, but better allows achievement of near 100% reaction yield.

The Effects

Type of Mixing Effects

In any mechanical mixing (which involves also grinding) it is expected that the particle size of the initial components in the mixture will have an influence on final state of the mixed powder, unless the mixing effect eliminates the variability of the initial particle size of powder. It is also expected that the type of equipment used for such mechanical mixing will have a bearing on the final state of the mixed powder. Hand mixing and grinding Aluminum metal and oxide powders in a mortar-pestle is laborious and produced Hydrogen in amount less than 50% of that obtained from using the mixed powder from the Spex mill. Ball milling using alumina balls was also time consuming as it took a few hours to mix the composite powder also at least 50 grams of powder had to be used per charge. Spex milling, which is high impact mixing/grinding with alumina balls, was used in almost all experimental tests.

In other tests aluminum metal was melted and mixed with the solid additive powder, such as aluminum oxide. This mix was solidified to form porous compacts and subjected to water test to generate hydrogen. This method of mixing of the two components was found to be similar to mechanical mixing, in terms of generating hydrogen from water. Therefore, mixing of aluminum metal in solid or liquid state with the additives and subsequently making porous compacts or loose powders are equally effective in generating hydrogen from water.

Effect of Time of Mixing

The effect of time of mixing in the Spex mill is shown in Table 3. All samples are Spex milled with alumina balls with 20 wt % boehmite additive (this is a boehmite, which was supplied by Alcoa and identified as Baymal) calcined at 700° C. The water temperature was 50° C. and pH was in the range 5.8 to 7.5. After about 10 minutes of milling no effect of longer milling time can be seen on the Hydrogen release from water.

TABLE 3

Mixing time effect on Hydrogen generation through Aluminum assisted water split reaction.

| Mixing Time (min) | $H_2$ release after 1 hr (cc/1 g Al) |
| --- | --- |
| 5 | 178 |
| 10 | 240 |
| 15 | 225 |
| 20 | 250 |
| 30 | 246 |

Regrinding Effect

The Aluminum-assisted water split reaction leads to precipitation of Aluminum hydroxide, according to reaction (2). The way this non-soluble product of reaction distributes throughout the system affects the reaction progress. For Al only reacting with water, the reaction products precipitate on Al surface, and rapidly form a passivation layer which stops any further reaction (this is why Al does not substantially corrode under normal conditions). As disclosed in the present invention, the Al-ceramic composites do not passivate through substantial portion of the water split reaction. It is anticipated that the reaction products (hydroxides) preferentially nucleate and deposit on the ceramic additives (e.g. alumina) supplied to the system through composing with Al, and/or are ejected to the surrounding liquid (water). As the reaction proceeds however, the reaction rate is slowed down (as measured through Hydrogen release rate), and eventually the reaction ceases. It is anticipated that the buildup of the reaction products, albeit on the pre-existing ceramic additives, eventually screens access of water to the fresh Al surface. In order to test this hypothesis, all the solids (i.e. the products and remaining reactant—Al) were re-ground for 10 min after the initial 1 hr of reaction, to expose the unreacted Al. The experimental conditions were the same as that used for the effect of mixing time. The water split reaction with the original pellet generated 147 cc of Hydrogen (per 1 g of Al) after 1 hr reaction. The remaining solids were re-ground and exposed to water again to additionally release 226 cc of Hydrogen (per 1 g of Al). The solids remaining from this second reaction were re-ground once again and the test was repeated. This last test generated further 368 cc of Hydrogen (per 1 g of Al). It is therefore observed that after each successive grinding of the same pellet more Hydrogen gas can be produced. This means that if grinding during the reaction with water can expose fresh clean surface of Aluminum particles, more Hydrogen can be generated, until all Aluminum is consumed. This is important to note that a method of continuous grinding while feeding water and powder of Al and/or Al+additive in a reactor may provide a way to produce Hydrogen gas continuously. This assessment is supported by the observation that regrinding continues to generate more and more hydrogen gas from the same pellet (see the section on Regrinding Effect).

Pelletization

For easy handling of the composite powder, the mixed powder was pelletized into either one gram or two grams pellets. These were about 0.5 inch (1.25 cm) in diameter and pelletized under either 5000 or 8000 psi. Pelletization has both advantage and disadvantage. For example, it is easy to insert a pellet inside the reactor full of water, which has to be enclosed to determine the amount of gas released. On the other hand, pressing the powder in a die made the pellet dense which restricted water penetration into the pellet for water split reaction to take place. Thus, it is noted that more the pressure applied on the die during pelletization, less the amount of Hydrogen gas produce under identical testing conditions.

(c) Reaction Temperature

It is obvious for those skilled in the art that the water split reaction will progress faster at higher temperatures. The objective of this testing program was to determine the increase of Hydrogen release from Aluminum-ceramic composites exposed to water. All samples prepared using 80 μm Al powder were Spex-milled for 10 min with 20 wt % gamma alumina All specimens weighing ~1 g were pressed into pellets under 5000 psi. The water temperature varied from 30° C. to 70° C. and pH was maintained in the range 5.8 to 7.5 (tap water).

The effects of reaction temperature on Al-assisted water split reaction are compiled in Table 4, and FIG. 2. The amount of Hydrogen gas generated is normalized as per gram of Aluminum metal. The temperature has a significant effect on the generation of Hydrogen. The increase becomes less significant above 600 C.

TABLE 4

Water temperature effect on Hydrogen generation in Aluminum assisted water split reaction.

| Water Temperature (° C.) | $H_2$ release after 1 hr (cc/1 g Al) |
| --- | --- |
| 30 | 20 |
| 40 | 110 |
| 50 | 185 |
| 60 | 220 |
| 70 | 224 |

(d) Water Acidity/Alkalinity

It is obvious for those skilled in the art that reactivity of Aluminum depends on acidity/alkalinity of water. In particular, it is known that pure Al will corrode in very acidic (pH<1) and very alkaline (pH>11) environments, with release of Hydrogen. It is also known that Al is practically immune to water in intermediate range of acidity/alkalinity close to neutral (4<pH<9) due to passivation property of Al. The objective of this experimental program was to determine the reactivity of Al-ceramic composites in water of wide range of acidity/alkalinity, in relation to reactivity of Al alone in similar systems.

Water Acidity/alkalinity Effects for Al-Ceramic Composites

All samples using 80 μm Al powder were Spex-milled for 10 min with alumina balls with 20 wt % gamma alumina (boehmite calcined at 700° C.). All specimens weighing ~1 g were pressed into pellets under 5000 psi. The water temperature was 50° C. The data are compiled in Table 5, and also in FIG. 3, together with the data for pure Al (refer to the following section). For the pH range of 4.7 to ~10.5 the amount of Hydrogen release for Al-ceramic composite pellets is in the range of about 131 to 184 cc (per 1 g of Al), at least one order of magnitude more than for pure Al in the same range of pH (refer to FIG. 3 and the following Table 6). For pH>11 the total amount of Hydrogen formed is increased. This shows that the caustic solution starts to corrode the layer of hydroxide formed on the metal surface. The same phenomenon occurs with pure Aluminum metal, as shown in later experiments, refer to the following section, Table 6 and FIG. 3. In all tests it was noted that pH value of the water slightly increased (by ~1.0 pH) at the end of the reaction, especially in the range of 5.5 to 9.5. These results are compared with pure Aluminum metal (80 $\mu$m particles) fabricated under identical conditions (but without the additive), in FIG. 3.

TABLE 5

Water pH effect on Hydrogen generation in Aluminum assisted water split reaction.

| Water pH | $H_2$ release after 1 hr (cc/1 g Al) |
| --- | --- |
| 1.5 | 170 |
| 2.3 | 175 |
| 3.7 | 182 |
| 4.7 | 198 |
| 5.5 | 197 |
| 6.5 | 176 |
| 9.5 | 170 |
| 10.5 | 178 |
| 11.0 | 198 |
| 11.5 | 333 |
| 12.0 | 450 |

TABLE 6

Water pH Effect on pure Al (80 $\mu$m) at 50° C.

| Powder Condition | Water pH | $H_2$ release after 1 hr (cc/1 g Al) |
| --- | --- | --- |
| Milled & Pressed Powder | 1.5 | 20 |
| Milled & Pressed Powder | 3.5 | 16 |
| Loose Powder As-received | 7.0 "Neutral" | No gas (0 cc) |
| Pressed Powder As-received | 7.0 "Neutral" | No gas (0 cc) |
| Milled & Pressed Powder | 7.0 "Neutral" | 20 |
| Loose Powder As-received | 11.5 "Highly Caustic" | 113 |
| Milled & Pressed Powder | 11.5 "Highly Caustic" | 160 |
| Pressed Powder As-received | 12.0 "Highly Caustic" | 267 |

Water Acidity/Alkalinity Effects for Pure Al Powders

In order to distinguish between the role of Aluminum oxide blended with Al, and pure Al, in producing Hydrogen from water, a series of experiments were carried out with the Al powder itself. The loose 80 $\mu$m powder, as received, was added to water at 50° C. at pH=7 ("neutral conditions"). Subsequently a pellet was produced from the same powder under 8000 psi and exposed to water at 50° C. Finally, the same powder was Spex-milled for 10 min, pelletized and exposed to water at 50° C. In addition, similar experiments were repeated where pH of the water was changed with caustic soda to "highly caustic" conditions at pH=11.5–12 and also made acidic adding HCl in water to lower the pH down to 1.5. The data are compiled in Table 6, and also included in FIG. 3.

The "as received" Aluminum powder does not produce any measurable amount of Hydrogen in contact with neutral pH water. Although milling the same powder seems to expose some of the passivated Al surface to make it available for the reaction, the passivation film is quickly restored, leading to very small release of Hydrogen from this system The caustic conditions do cause substantial reaction with pure Al, as expected. These results, together with the data from Table 5, are mapped in FIG. 3 to illustrate the effect of alumina additive on water split reaction in a range of pH values from 1.5 to 12.0. Between pH 3 to 10, with alumina additive about 15 to 18% of the available Aluminum metal was consumed generating Hydrogen gas.

Summary of the Effects of the above Variables an Al-Assisted Water Split Reaction In summary, it has been proven beyond doubt that in every experimental tests that Hydrogen is generated when the metal-ceramic powder, either in the pelletized form or as loose powder, is submerged in water, both at ambient temperature (~20° C.) or at elevated temperature up to 90° C., at neutral or close to neutral pH. The necessary condition for the reaction to progress at neutral or close to neutral pH is that the Aluminum and ceramic additive are in physical contact during the reaction.

The rate of generation of gas and the total amount of gas produced depend on several factors:

1. The maximum rate of gas release depends on (i) nature of milling (ii) type of ceramic additive (iii) temperature of reaction and (iv) pH of the water. The total amount of gas release does not vary significantly with different type of alumina ceramic additive, produced from different Aluminum hydroxides, (or Aluminum hydroxide).
2. Temperature has a significant effect both on the rate of $H_2$ generation and the total amount of the gas produced.
3. pH has a strong effect on both the rate of gas release and the total amount of $H_2$ produced. However, below pH=10 the effect is not noticeable. It has been known that both caustic soda and HCl attack and corrode Aluminum metal producing Hydrogen gas. Both caustic soda and HCl is dangerous to human health and damaging to environment.
4. The key feature of the investigated systems is the ability to generate substantial amount of Hydrogen through water split reaction at neutral pH (pH=6–7).

FURTHER EXAMPLES OF SPECIFIC EMBODIMENTS OF THE INVENTION

The following examples clearly illustrate the specific embodiments of the invention, but should not be construed as restricting the spirit or scope of the invention in any way. These example processes to produce Hydrogen in Al-assisted water split reaction used Al powder blended with variety of ceramic powders, generally aluminium oxide or hydroxide, in variety of forms and morphologies, as described in the preceding sections. The blending method is critical to initiate and sustain the water split reaction. The high-energy blending techniques, which produce multiple metal-ceramic interfaces, are more effective. The principal process variables included mass ratio of the Al to the ceramic, methods and time of blending the powders, temperature and pH of reaction environment. Reference tests were performed with the separate powders of Al and ceramic, in a variety of environments. The principal parameter measured in all the tests was the total amount of Hydrogen (cc) released after 1 hr of reaction, normalized to 1 g of Al reactant. Additionally, accumulation of Hydrogen during the 1 hr reaction was monitored in short time intervals (i.e. 1 min) to determine variations in the reaction rates. These data are provided in the following examples, and illustrated in FIGS. 1–4. In each of these case the experiment represented in FIGS. 1 through 4 reacted only part of the available Al from the total Al in the pellets.

Example 1

Water-split Reaction for the Reference System: Al Powder Only

The Al powder (99% Al, 80 $\mu$m average particle size) was pelletized at 8000 psi and the 1 g pellet dropped to tap water at approximately pH=6 and T=50° C. There was no Hydrogen generation after 1 hr test.

Example 2

Water-split Reaction for the Reference System: Al Powder Only

The Al powder (99% Al, 80 $\mu$m average particle size) was Spex-milled for 15 min., pelletized at 8000 psi and the 1 g pellet dropped to tap water at approximately pH=6 and T=50° C. The total amount of Hydrogen released from the reactor after 1 hr was 10 cc per 1 g Al.

Example 3

Water-split Reaction for the Reference System: Oxidized Al Powder

The Al powder (initially 99% Al, 80 $\mu$m average particle size) was partially oxidized for 72 hr, which resulted in 0.05% weight increase due to formation of Aluminum oxide layer on its surface. The partially oxidized powder was Spex-milled for 15 min, pelletized at 8000 psi and the 1 g pellet dropped to tap water at approximately pH=6 and T=50° C. The total amount of Hydrogen released from the reactor after 1 hr was 7 cc per 1 g Al.

Example 4

Water-split Reaction for the Composite System: Mixed Al+Al$_2$O$_3$

The Al powder (99% Al, 80 $\mu$m average particle size, 1.6 g), and Al$_2$O$_3$ powder (alpha-alumina, 0.2 $\mu$m average particle size, 0.4 g) was loosely mixed without generation of multiple contacts between metal and ceramic, for 10 min., pelletized at 8000 psi and the pellet dropped to tap water at approximately pH=6 and T=50° C. There was no Hydrogen generation after 1 hr test.

Example 5

Water-split Reaction for the Composite System: Milled Al–Al$_2$O$_3$

The Al powder (99% Al, 80 $\mu$m average particle size, 1.6 g), and Al$_2$O$_3$ powder (alpha-alumina, 0.2 $\mu$m average particle, 0.4 g) was Spex-milled for 10 min., pelletized at 8000 psi and the pellet dropped to tap water at approximately pH=6 and T=50° C. The total amount of Hydrogen released from the reactor after 1 hr was 200 cc, equivalent to 125 cc/1 g of Al.

Example 6

Water-split Reaction for the Composite System: Al-Calcined Boehmite

The Al powder (99% Al, 80 $\mu$m average particle size, 1.6 g), and AlOOH powder calcined at 700° C. (0.4 g) was Spex-milled for 10 min, pelletized at 5000 psi and the pellet dropped to tap water at approximately pH=6 and T=50° C. The total amount of Hydrogen released from the reactor after 1 hr was 296 cc, equivalent to 185 cc/1 g of Al. By decreasing the temperature to 40° C., the H$_2$ yield was 110 cc/1 g of Al, whereas at 60° C., the H$_2$ yield was 220 cc/1 g of Al. If the amount of Al in the pellet was 1 g and amount of calcined boehmite in the pellet was 1 g (50 wt %), the H$_2$ yield was 515 cc/1 g of Al, for the T=50° C. bath. If the amount of Al in the pellet was 0.5 g and amount of calcined boehmite in the pellet was 1.5 g (75 wt %), the H$_2$ yield was 650 cc/1 g of Al, for the T=50° C. bath If the amount of Al in the pellet was further decreased to 10% of the total amount of the composite (calcined boehmite in the pellet is 90 wt %), the H$_2$ yield was 870 cc/1 g of Al, for the T=50° C. bath. The results given in Example #6 show the effect of temperature and also of concentration on the Hydrogen generation. The results are shown Tables 2 and 4.

Example 7

Experimental Tests and Results with $\alpha$-Al$_2$O$_3$+ Aluminum

For these tests a very easily available and low-cost powder alpha alumina powder (supplied by Alcan Aluminum Co.), was used. This type of powder is typically used as refractory material for furnace insulation and is also one of the main materials in Aluminum smelters for the production of Aluminum metal. The powders were coarse (>50 $\mu$m grain size), but softly agglomerated, i.e. can be crushed in an agate mortar and pestle. A thorough study using $\alpha$-Al$_2$O$_3$ powder was carried out, in which the effect of the concentration of catalyst (alumina additive) and water temperature was repeatedly made to ensure that the results are reproducible. The powder mixture was ground for 20 minutes in the high-intensity Spex mill, and pelletized under 5000–6000 psi pressure. The ~1 g pellets were immersed in tap water at 50° C. and Hydrogen release was recorded as a function of time up to 70 minutes. The pH in the reactor increased during this period from 6.5 to 7.8. These results are shown in Table 7 and FIG. 6. All data are normalized to volume of H$_2$ generated per one gram of metal (Al). These data confirm the previous results for the amount of catalyst up to 70 wt %. However, unusually large amounts of Hydrogen (per 1 g Al) are observed for very high amount of catalyst, i.e. 90 and 95%.

TABLE 7

Effect of the Amount of $Al_2O_3$ Additive in $Al/Al_2O_3$ System

| Amount of $Al_2O_3$ Catalyst (wt %) | $H_2$ release: after 1 hr (cc/1 g Al) | $H_2$ release: max. rate (cc/min) | Time at max $H_2$ rel. (min) |
|---|---|---|---|
| 5 | 24 | 0.8 | 26 |
| 10 | 26 | 2.0 | 10 |
| 20 | 208 | 12 | 9.0 |
| 30 | 333 | 25 | 8.0 |
| 50 | 487 | 25 | 16 |
| 70 | 782 | 30 | 6.0 |
| 90 | 1100 | 48 | 3.0 |
| 95 | 1200 | 12 | 3.0 |

Figure 6:
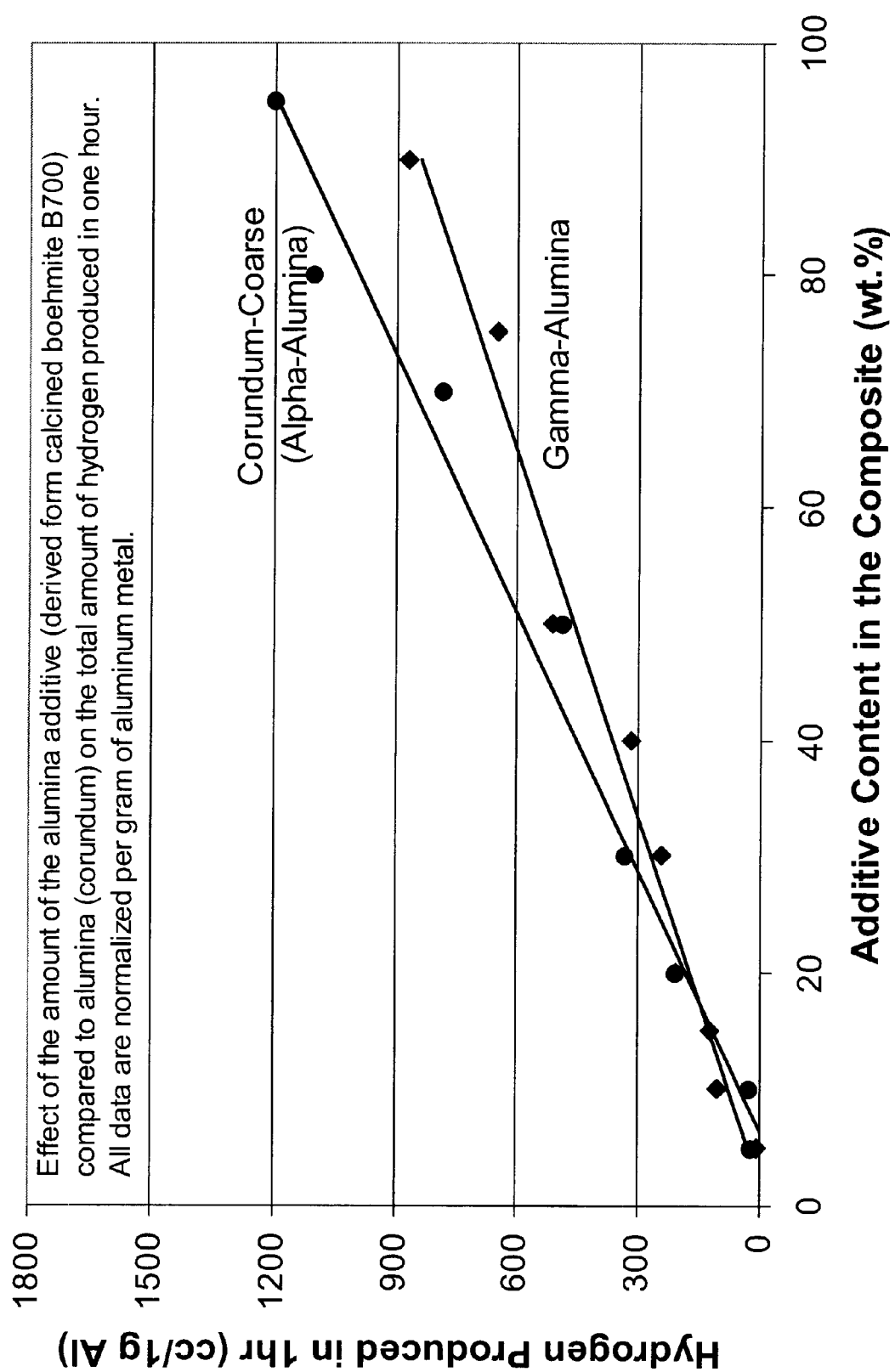
FIG. 6 is a plot showing the effect of the amount of gamma alumina additive derived from calcined Boehmite compared to alpha Alumina (corundum) on total Hydrogen produced in 1 hour normalized per gram of Al metal.

These results can be compared with that of $\gamma$-$Al_2O_3$ (derived form boehmite calcined at 700° C. This shows that $\alpha$-$Al_2O_3$ is as good a catalyst as $\gamma$-$Al_2O_3$ in generating $H_2$ from water. This comparison is shown in FIG. 6.

Example 8

Hydrogen Generation using Aluminum and Carbon

Figure 7:
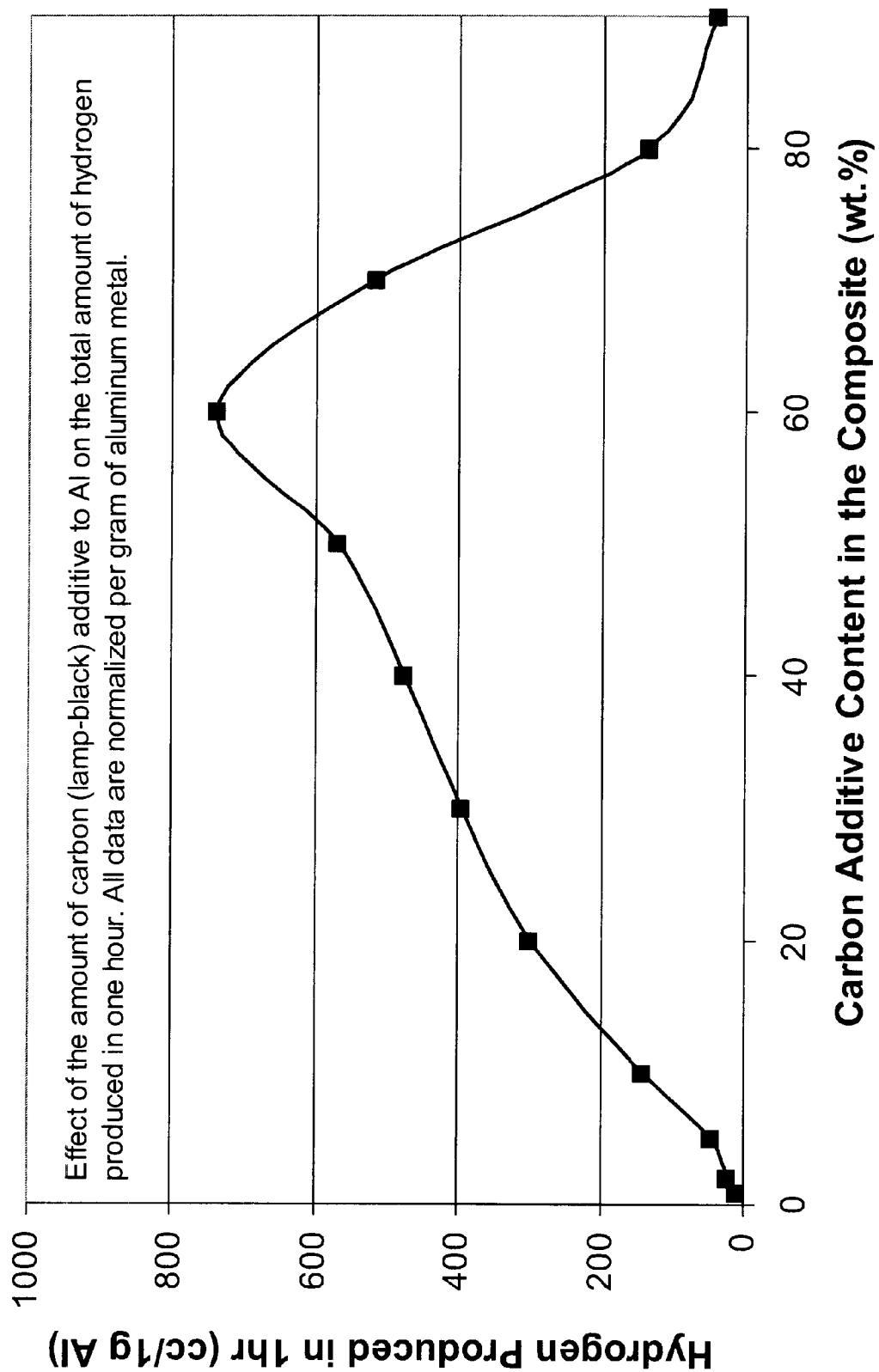
FIG. 7 is a plot showing the effect of the amount of carbon (Lampblack) to Al on total Hydrogen produced in 1 hour-normalized per gram of Al metal.

In order to determine the role of carbon for the generation of $H_2$ a series of experiments were carried out with mixtures of lampblack and Aluminum metal powder. The concentration of lampblack varied from 1 to 90 wt % of the total. The powder was mixed in the Spex-mill for 20 min and pressed into pellets at 1000–1200 lb load (corresponding to 5000–6000 psi). The tests were carried out in tap water (pH=6.5 to 7.5) at 50° C. The results are shown in Table 8 and also plotted in FIG. 7. All data are normalized as generation of Hydrogen per one gram of Aluminum metal. The data show a pattern that is very similar to the $Al/Al_2O_3$ system (up to ~60 wt % catalyst), the most effective system found so far. However, for the C-catalyst above ~60 wt %, a decreasing amount of Hydrogen was released in this system, in clear contrast to the $Al/Al_2O_3$ system.

TABLE 8

Effect of the Amount of Carbon Additive in Al/C System

| Amount of C - Catalyst (wt %) | $H_2$ release: after 1 hr (cc/1 g Al) | $H_2$ release: max. rate (cc/min) | Time at max $H_2$ rel. (min) |
|---|---|---|---|
| 1 | 11 | 0.5 | 12 |
| 5 | 46 | 2.5 | 12 |
| 10 | 140 | 8.0 | 7 |
| 20 | 300 | 25 | 10 |
| 30 | 395 | 20 | 10 |
| 40 | 477 | 30 | 8 |
| 50 | 570 | 20 | 12 |
| 60 | 738 | 15 | 23 |
| 70 | 516 | 5.0 | 23 |
| 80 | 137 | 1.0 | 34 |
| 90 | 40 | 1.0 | 35 |

Figure 8:
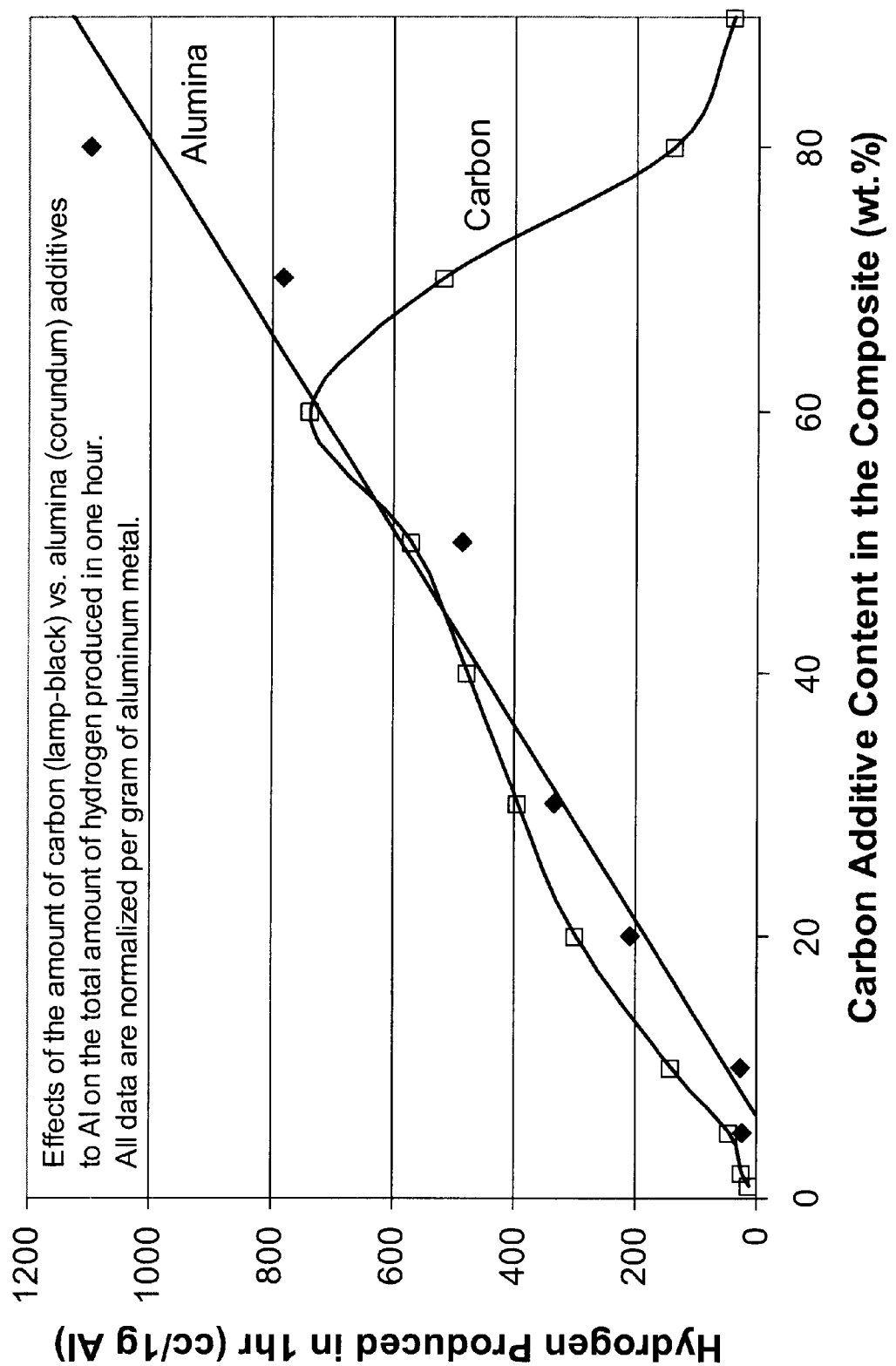
FIG. 8 is a plot showing the effect of the amount of carbon (Lampblack) vs. alumina $Al_2O_3$ (corundum) additives to Al on total Hydrogen produced-normalized per gram of Al metal.

Table 6 shows that lampblack carbon is at least as effective additive as alumina in $Al/Al_2O_3$ system in generating Hydrogen from water up to the concentration of 60 wt % carbon. The results are compared in FIG. 8. It is possible that in this system Al particles are partially (or totally, for higher concentrations of carbon) coated by carbon. Because carbon is not wetted by water, water could not come into contact with the metallic phase and no Hydrogen could be generated, for the higher concentrations of carbon. However, for the concentrations up to 60 wt % there is significant amount of $H_2$ generation.

Example 9

Results for Al/(Carbon+$\alpha$-$Al_2O_3$)

Figure 9:
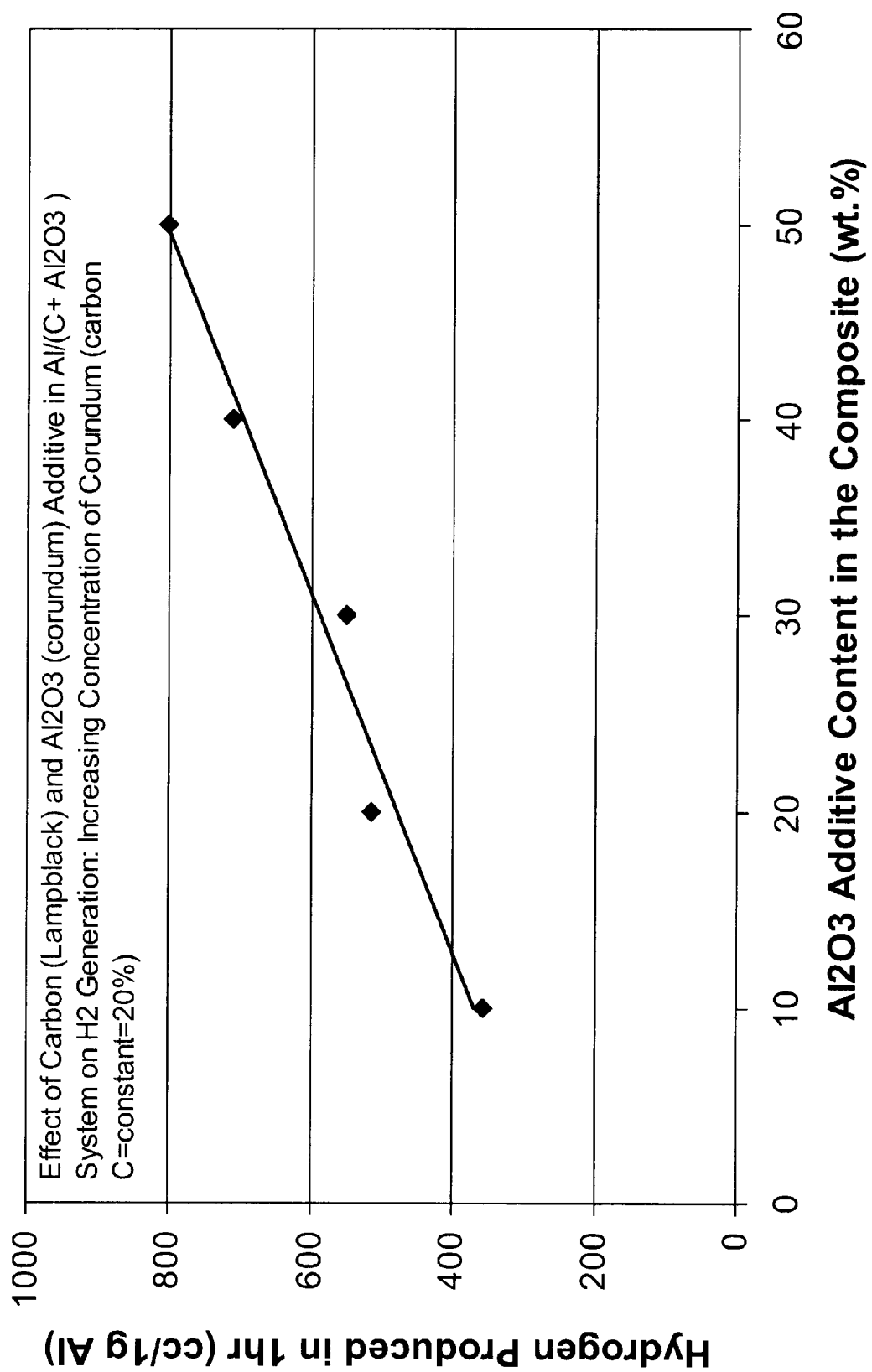
FIG. 9 is a plot showing the effect of Carbon (Lampblack) and $Al_2O_3$ (corundum) additive in Al—(C+$Al_2O_3$) System on total Hydrogen produced-normalized per gram of Al metal, (carbon content constant at 20%).
Figure 10:
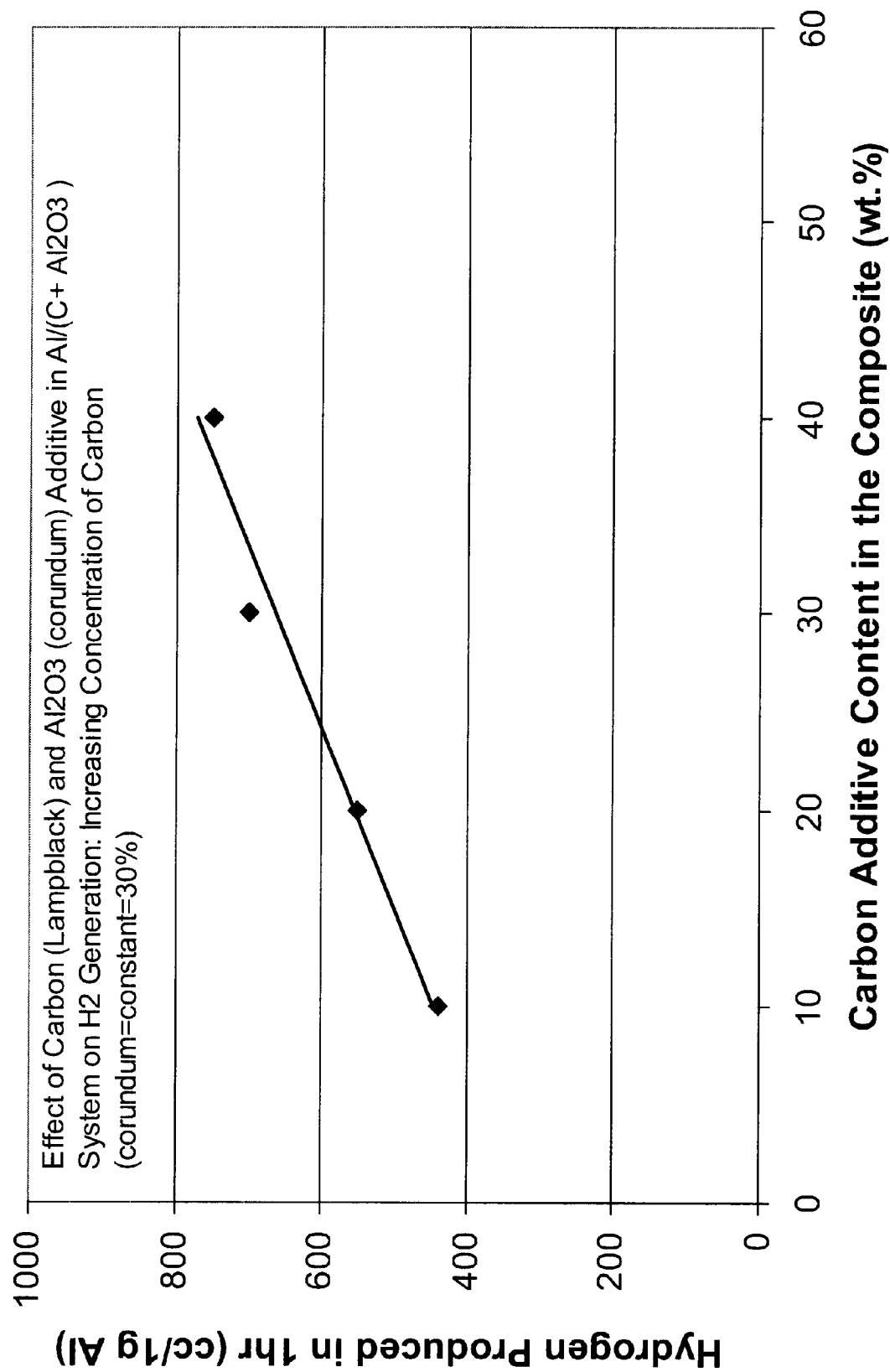
FIG. 10 is a plot showing the effect of carbon (Lampblack) and $Al_2O_3$ (corundum) additive in Al—(C+$Al_2O_3$) System on total Hydrogen produced-normalized per gram of Al metal, (corundum content constant at 30%).

This series of experiments were carried out with the view to explore if the rate of Hydrogen generation could be affected (i.e. also corrosion rate of Al accelerated) by using a mixed catalyst. Another important ramification of this study is that the electrical conductivity in $Al/Al_2O_3$ pellets could be increased by addition of carbon in the system. Such conductive catalyst system is useful in combining Al-assisted water split reaction with water electrolysis. The results are presented in Table 9 and Table 10, and in the respective FIG. 9 and FIG. 10. These tables show that increasing either carbon or alpha-alumina in the system (as catalysts) definitely improves Hydrogen generation. However, when compared to each other, the effect of increasing carbon content is very similar to the effect of increasing alpha-alumina content.

TABLE 9

Effect of Carbon (Lampblack) and $Al_2O_3$ (corundum) Additive in Al/(C + $\alpha$-$Al_2O_3$) System on Liz Generation, (increasing Concentration of Corundum)

| Amount of C - Catalyst (wt %) | Amount of $Al_2O_3$ - Catalyst (wt %) | $H_2$ release: after 1 hr (cc/1 g Al) | $H_2$ release: max. rate (cc/min) | Time at max $H_2$ release (min) |
|---|---|---|---|---|
| 20 | 10 | 357 | 0.5 | 10 |
| 20 | 20 | 516 | 2.5 | 12 |
| 20 | 30 | 550 | 8.0 | 12 |
| 20 | 40 | 712 | 25 | 16 |
| 20 | 50 | 803 | 20 | 16 |

TABLE 10

Effect of Carbon (Lampblack) and $Al_2O_3$ (corundum) Additive in Al/(C + $\alpha$-$Al_2O_3$) System on $H_2$ Generation, (increasing Concentration of Carbon)

| Amount of C - Catalyst (wt %) | Amount of $Al_2O_3$- Catalyst (wt %) | $H_2$ release: after 1 hr (cc/1 g Al) | $H_2$ release: max. rate (cc/min) | Time at max $H_2$ rel. (min) |
|---|---|---|---|---|
| 10 | 30 | 438 | 16 | 20 |
| 20 | 30 | 550 | 18 | 12 |
| 30 | 30 | 700 | 15 | 14 |
| 40 | 30 | 750 | 9.0 | 12 |

Example 10

Effects of Various Other Ceramic Catalysts (Additives) on $H_2$ Release in Al/Catalyst Systems This series of experiments was conducted to test the catalytic abilities of 30 wt % of variety of other ceramic powders blended with Al on releasing Hydrogen. All mixtures were prepared and tested as before. The results are shown in Table 11. All data are normalized as generation of Hydrogen per one gram of Aluminum metal. Both gamma-$Al_2O_3$ and alpha-$Al_2O_3$ results are also included in this table for comparison.

TABLE 11

Effect of 30 wt % of Various Ceramic Additives Mixed with Al

| Type of Catalyst (30 wt %) | $H_2$ release: after 1 hr (cc/1 g Al) | $H_2$ release: max. rate (cc/min) | Time at max $H_2$ release. (min) |
|---|---|---|---|
| $SiO_2$ | 40 | 1.5 | 16 |
| $CaCO_3$ | 104 | 5.0 | 6 |
| $Ca(OH)_2$ | 106 | 25 | 1 |
| China Clay | 160 | 10 | 5 |
| Ball Clay | 215 | 7.5 | 20 |
| $Al_2O_3$ 0.2 μm | 201 | 10 | 18 |

It must be noted that catalysts other than $Al_2O_3$ and carbon are not very attractive in generating $H_2$ from the point of view of recyclability of the by-products of the reaction, which would be $Al(OH)_3$, Al (unreacted) and the catalyst (either reacted or unreacted). It would not be easy to separate $Al+Al(OH)_x$ from other catalysts either mechanically or chemically to recover $[Al+Al(OH)_x]$ for recycling. It is interesting to note that ball clay and china clay, if blended with Al, can also produce $H_2$, about ⅔ of the amount generated with $Al/Al_2O_3$ composite powder. Again, it is worth noting that these catalysts cannot be used commercially as the final products cannot be recycled.

Example 11

Aluminum-Soluble Organic Salts

It appeared from the above, that just maintaining clean surface (i.e. non-oxidized surface) of Aluminum metal could split water into $H_2$ and $Al(OH)_x$. This can be accomplished by use of water-soluble organic compounds, such as polyvinyl alcohol (PVA) or polyethylene glycol (PEG) with Al metal, for spliting water and generating Hydrogen. To test this concept, Al metal was mixed with PEG (4000 molecular weight, 3–20 wt %), Spex milled for 20 minutes, pelletized (as described before) and water tested at a neutral pH and 50° C. The results are shown in Table 9. The results indicate that it is indeed possible to generate $H_2$ using Al+water soluble organic polymers. However, the results are different than those obtained for carbon or Aluminum oxide additives. The amount of Hydrogen generated (~225 cc per one gram of Al) appears to be independent on PEG concentration. The extent of $H_2$ generation corresponds to ~18% of Al converted to $Al(OH)_x$. This value is similar to the system with ball clay Table 8. This may be a reflection of a true conversion efficiency of Al metal powder under these experimental conditions.

TABLE 12

Effect of the Amount of Polyethylene Glycol Additive in Al on $H_2$ Generation

| Amount of PEG Catalyst (wt %) | $H_2$ release: after 1 hr (cc/1 g Al) | $H_2$ release: max. rate (cc/min) | Time at max $H_2$ release (min) |
|---|---|---|---|
| 3 | 220 | 3.0 | 20 (steady) |
| 5 | 215 | 4.0 | 20 (steady) |
| 10 | 230 | 3.7 | 20 (steady) |
| 20 | 250 | 4.0 | 25 |

Example 12

Mg—MgO System

Figure 11:
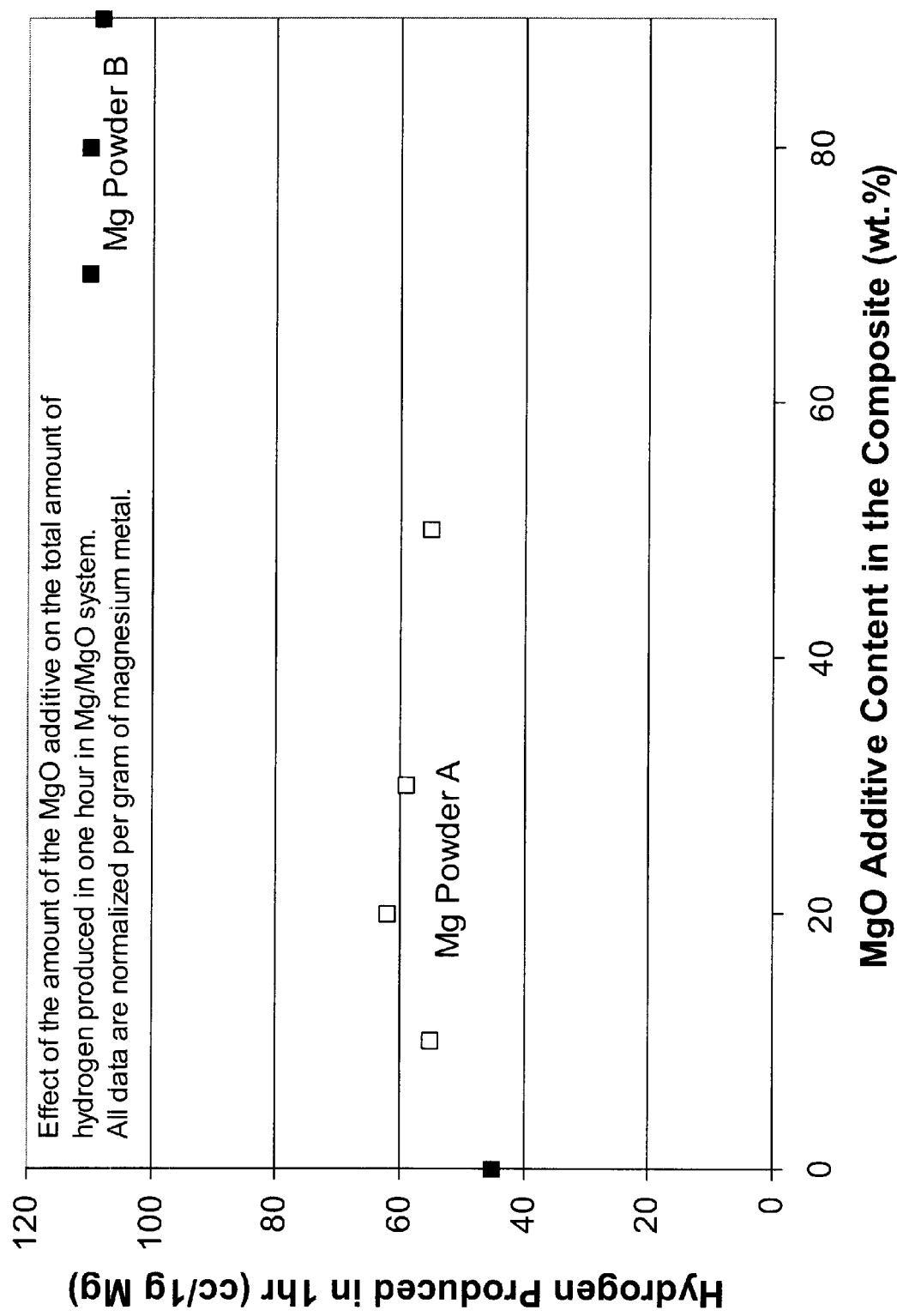
FIG. 11 is a plot showing the effectiveness of an magnesium (Mg) magnesium oxide (MgO) system for generating hydrogen ($H_2$) using different ratios of Mg to MgO.

It is well known that fine Mg powder can ignite spontaneously when exposed to air. The reaction with oxygen is sufficiently spontaneous to create an effect of violent "burning", commonly utilized in firecrackers. Al may behave similarly under certain conditions, i.e. very fine un-oxidized, non-passivated powder exposed to air. For the same reason, Mg metal should react with water, getting itself oxidized and releasing Hydrogen in the process. Although Mg is currently more than double the price of Al, it is thought prudent to explore water split reaction capability in the system Mg—MgO. As before, Mg metal powder reagent grade (~0.1 mm particle size) was mixed with very fine MgO powder (reagent grade) using Spex mill for 20 min and pelletized under 1000–1200 lb. The MgO content in the mixture varied form 0% to 90 wt %. The water test was carried out of 50° C. The pH was found to increase from 6.5 to ~9.8 as the reaction progressed. These results are shown in Table 13 and are plotted in FIG. 11.

TABLE 13

Effect of the Amount of MgO Additive in Mg/MgO System

| Amount of MgO Catalyst (wt %) | $H_2$ release: after 1 hr (cc/1 g Mg) | $H_2$ release: max. rate (cc/min) | Time at max $H_2$ rel. (min) |
|---|---|---|---|
| 0* | 45 | 3.0 | 10 |
| 10* | 55 | 39 | 1 |
| 20* | 62 | 23 | 1 |
| 30* | 59 | 19 | 1 |
| 50* | 55 | 11 | 1 |
| 70 | 110 | 1.3 | 20 |
| 80 | 110 | 1.0 | 4 |
| 90 | 108 | 0.3 | 15 |

*these experiments were done with a coarser Mg powder

* these experiments were done with a coarser Mg powder

There is a relatively small and approximately constant (50–60 cc) volume of $H_2$ released for these systems up to 50 wt % catalyst. For higher amounts of the catalyst the Hydrogen release was approximately 110 cc/1 g of Mg. Mg/MgO system does not appear to have the ability of $Al/Al_2O_3$ system in splitting water in neutral pH. During the water test there was a continuous rise of pH of the water, from ~6.5 to ~9.0.

Example 13

System Al—Mg—$Al_2O_3$

The system of Al+Mg metals and Aluminum oxide was studied to evaluate the effect of mechanically alloying two metals on Hydrogen generation from water. The powder mixtures were produced following the same procedure described before. The composition of the mixture varied in such a way that the concentration of Al metal was kept constant to 50 wt %, and part of $Al_2O_3$ was replaced with Mg, as shown in Table 14.

TABLE 14

Effect of the Amount of $Al_2O_3$ Additive in $(Mg,Al)/Al_2O_3$ System

| Amount of $Al_2O_3$ Catalyst (wt %) | Amount of Al Metal (wt %) | Amount of Mg Metal (wt %) | $H_2$ release: after 1 hr (cc/1 g total Metal) | $H_2$ release: after 1 hr (cc/1 g Al Metal) | $H_2$ release: max. rate (cc/min) | Time at max $H_2$ rel. (min) |
|---|---|---|---|---|---|---|
| 45 | 50 | 5 | 416 | 458 | 35 | 2 |
| 40 | 50 | 10 | 318 | 458 | 45 | 1 |
| 30 | 50 | 20 | 314 | 440 | 40 | 1 |
| 25 | 50 | 25 | 266 | 400 | 35 | 1 |

The results showed clearly that when $Al_2O_3$ concentration was reduced the Hydrogen generation was decreased per gram of total metal (Al+Mg). If the Hydrogen generation was recalculated on the basis of Al present, then the results show that the amount of $H_2$ (per 1 g of Al) remained about constant, although the catalyst concentration was reduced. This indicates that Mg helped somewhat in generating Hydrogen. However, overall mechanical alloying of Al with Mg did not significantly improve Hydrogen generation. On top of that, this is not a very attractive system for commercialization, as the by-products of reaction, i.e. $Al(OH)_3$ and $Mg(OH)_2$, as well as unreacted Al and Mg, can not be easily separated for recycling.

Example 14

Addition of Other Metal-Oxide Systems

In order to explore further if mechanical nixing of other metals and their corresponding oxides can also help in water-split reaction generating Hydrogen, attempts were made to test the following systems: Fe—$Fe_3O_4$, Ni—NiO, Cu—$Cu_2O$, Si—$SiO_2$, Zn—ZnO and Ti—$TiO_2$. The concentration of the oxide phase was maintained constant at 30 wt % in every system The procedure for pellet preparation and testing was also the same as before (20 min of Spex milling followed by 5000–6000 psi pelletization; water test at pH=6.8 to 7.2, at 50° C.). The results are shown in Table 15.

TABLE 15

Additional Metal-Oxide Systems: Effect of 30 wt % of Various Ceramic Oxides Mixed with the Parent Metal

| System (30 wt % oxide) | $H_2$ release: after 1 hr (cc/1 g metal) | Theoretical $H_2$ release (cc/1 g metal) |
|---|---|---|
| Fe—$Fe_3O_4$ | 0 | — |
| Cu—$Cu_2O$ | 0 | — |
| Ni—NiO | 2 | — |
| Si—$SiO_2$ | 195 | 12% |
| Zn—ZnO | 34 | 10% |
| Ti—$TiO_2$ | 0 | — |

The theoretical (maximum) release of $H_2$ in water split reaction for the various metals is obtained on the basis of the following reactions:

$$Si + 2H_2O \rightarrow SiO_2 + 2H_2$$

$$Zn + H_2O \rightarrow ZnO + H_2$$

It is interesting to note that both Si and Zn can split water at 50° C. in neutral pH, although not very efficiently.

Having described the invention modifications will be evident to those skilled in the art without departing from the spirit of the invention as defined in the appended claims.

What is claimed is:

1. A method of producing Hydrogen comprising reacting metal particles selected from the group consisting of Aluminum (Al), Magnesium (Mg), Silicon (Si) and Zinc (Zn) with water in the presence of an effective amount of a catalyst at a pH of between 4 and 10 to produce reaction products which include Hydrogen, said catalyst is selected to be suitable for said metal particles being reacted and from the group consisting of alumina, suitable ceramic compounds containing aluminum ions, Carbon (C), calcium carbonate ($CaCO_3$), calcium hydroxide ($Ca(OH)_2$), polyethylene glycol (PEG), and combinations thereof, magnesium oxide (MgO), Silicon dioxide ($SiO_2$), and Zinc oxide (ZnO) that facilitate said reacting said metal with said water and improves production of said Hydrogen.

2. A method as defined in claim 1 wherein said metal and catalyst are blended into intimate physical contact.

3. A method as defined in claim 2 wherein said catalyst is in the form of catalyst particles, said metal particles and said catalyst particles are particles in the size range between 0.01 µm and 1000 µm.

4. A method as defined in claim 3 wherein said metal is Aluminum (Al) and said catalyst is selected from the group consisting of Alumina, suitable ceramic compounds containing aluminum ions, Carbon (C), calcium carbonate ($CaCO_3$), and calcium hydroxide ($Ca(OH)_2$).

5. A method as defined in claim 4 wherein said catalyst is Alumina and/or a ceramic compound containing aluminum ions.

6. A method as defined in claim 5 wherein said catalyst is a ceramic compound containing aluminum ions selected from the group consisting of Aluminum oxides, Aluminum hydroxides and combination thereof.

7. A method as defined in claim 4 wherein said catalyst is carbon.

8. A method as defined in claim 2 wherein said metal is Aluminum (Al) and said catalyst is selected from the group consisting of alumina, suitable ceramic compounds containing aluminum ions, Carbon (C), calcium carbonate ($CaCO_3$), and calcium hydroxide ($Ca(OH)_2$).

9. A method as defined in claim 8 wherein said catalyst is selected from the group consisting of Alumina and suitable ceramic compounds containing aluminum ions.

10. A method as defined in claim 9 wherein said catalyst is Alumina and/or a ceramic containing compound aluminum ions.

11. A method as defined in claim 10 wherein said catalyst is a ceramic containing aluminum ions compound selected from the group consisting of Aluminum oxides, Aluminum hydroxides and combinations thereof.

12. A method as defined in claim 8 wherein said catalyst is Alumina and/or a ceramic containing aluminum ions compound.

13. A method as defined in claim 12 wherein said catalyst is a ceramic containing aluminum ions compound selected from the group consisting of Aluminum oxides, Aluminum hydroxides and combinations thereof.

14. A method as defined in claim 2 wherein said metal is Aluminum (Al) and said catalyst comprises poylethylene glycol (PEG).

15. A method as defined in claim 2 wherein said metal is Magnesium (Mg) and said catalyst is magnesium oxide (MgO).

16. A method as-defined in claim 2 wherein said metal is Silicon (Si) and said catalyst is Silicon dioxide ($SiO_2$).

17. A method as defined in claim 2 wherein said metal is Zinc (Zn) and said catalyst is Zinc oxide (ZnO).

18. A method as defined in claim 2 wherein said blended into intimate physical contact comprises mixing said metal and said catalyst in a mixer that pulverizes said metal and said catalyst and exposes fresh surfaces of said metal.

19. A method as defined in claim 18 wherein said metal and said catalyst are formed into pellets and said pellets are then mixed with said water.

20. A method as defined in claim 18 wherein said metal is Aluminum (Al) and said catalyst is selected from the group consisting of Alumina, suitable ceramic compounds containing aluminum ions, Carbon (C), calcium carbonate ($CaCO_3$), and calcium hydroxide ($Ca(OH)_2$).

21. A method as defined in claim 20 wherein said catalyst is Alumina and/or a ceramic compound containing aluminum ions.

22. A method as defined in claim 21 wherein said catalyst is a ceramic containing aluminum ions compound selected from the group consisting of Aluminum oxides, Aluminum hydroxides and combinations thereof.

23. A method as defined in claim 2 wherein said metal is Aluminum (Al) and said catalyst comprises a combination of at least one additive selected from the group consisting of Alumina and suitable ceramic compounds containing aluminum ions compounds and at least one additive selected from the group consisting of organic water soluble compounds.

24. A method as defined in claim 17 wherein said water soluble organic compound is poylethylene glycol (PEG).

* * * * *